US012527933B2

(12) United States Patent
Nortman et al.

(10) Patent No.: US 12,527,933 B2
(45) Date of Patent: *Jan. 20, 2026

(54) AUTOMATIC PLACEMENT OF A MASK

(71) Applicant: Restful Robotics, Inc., Sunrise, FL (US)

(72) Inventors: Scott Nortman, Sunrise, FL (US); David Jassir, Davie, FL (US)

(73) Assignee: Restful Robotics, Inc., Sunrise, FL (US)

( * ) Notice: Subject to any disclaimer, the term of this patent is extended or adjusted under 35 U.S.C. 154(b) by 860 days.

This patent is subject to a terminal disclaimer.

(21) Appl. No.: 17/775,866

(22) PCT Filed: Nov. 10, 2020

(86) PCT No.: PCT/US2020/059803
§ 371 (c)(1),
(2) Date: May 10, 2022

(87) PCT Pub. No.: WO2021/096839
PCT Pub. Date: May 20, 2021

(65) Prior Publication Data
US 2025/0161619 A1    May 22, 2025

Related U.S. Application Data

(60) Provisional application No. 62/933,620, filed on Nov. 11, 2019.

(51) Int. Cl.
*A61M 16/06*    (2006.01)
*A61B 34/20*    (2016.01)
(Continued)

(52) U.S. Cl.
CPC ............. *A61M 16/06* (2013.01); *A61B 34/32* (2016.02); *A61M 16/022* (2017.08);
(Continued)

(58) Field of Classification Search
CPC .............. A61M 16/0683; A61M 16/06; A61M 2210/0625; A61M 2210/0618;
(Continued)

(56) References Cited

U.S. PATENT DOCUMENTS

2018/0220897 A1*  8/2018  Meger .................... G01G 19/44

FOREIGN PATENT DOCUMENTS

| CN | 108969858 A | * | 8/2018 | ........ A61M 16/0051 |
| WO | WO-2012085741 A1 | * | 6/2012 | ........... A61B 5/4812 |
| WO | WO-2016114834 A2 | * | 7/2016 | ............. A61B 34/32 |

* cited by examiner

*Primary Examiner* — Brandy S Lee
*Assistant Examiner* — Rohan Patel
(74) *Attorney, Agent, or Firm* — J. Steven Svoboda

(57) ABSTRACT

A robotic arm system can include a robot including a robot flange, a mask coupled to the robot flange, a ventilator coupled to the mask, and one or more controllers operable to change a pose of the robot flange. The controllers are further operable to deliver gas from the ventilator to the mask. The robot can include the ventilator. The robotic arm system can include a gas tube coupled to the mask and the ventilator, wherein the gas tube is configured to carry gas between the ventilator and the mask. The robotic arm system can include a computer vision system, one or more biometric sensor systems, and/or a sensing system. The ventilator can be a positive airway pressure ventilator. The mask can be a nasal mask, a mouth mask, or a face mask.

17 Claims, 26 Drawing Sheets

(51) Int. Cl.
*A61B 34/32* (2016.01)
*A61M 16/00* (2006.01)
*A61M 16/08* (2006.01)

(52) U.S. Cl.
CPC ...... *A61M 16/024* (2017.08); *A61M 16/0616* (2014.02); *A61M 16/0683* (2013.01); *A61M 16/0875* (2013.01); *A61B 2034/2065* (2016.02); *A61M 2205/0216* (2013.01); *A61M 2205/13* (2013.01); *A61M 2205/3303* (2013.01); *A61M 2205/587* (2013.01); *A61M 2209/082* (2013.01); *A61M 2210/0618* (2013.01); *A61M 2210/0625* (2013.01); *A61M 2230/04* (2013.01); *A61M 2230/18* (2013.01); *A61M 2230/42* (2013.01); *A61M 2230/50* (2013.01); *A61M 2230/63* (2013.01)

(58) Field of Classification Search
CPC ...... A61M 2034/2065; A61M 2205/13; A61M 2230/00; A61M 16/00; A61M 16/0605; A61B 2034/2055; A61B 34/32; A61B 34/30; A61B 90/50; A62B 18/08
See application file for complete search history.

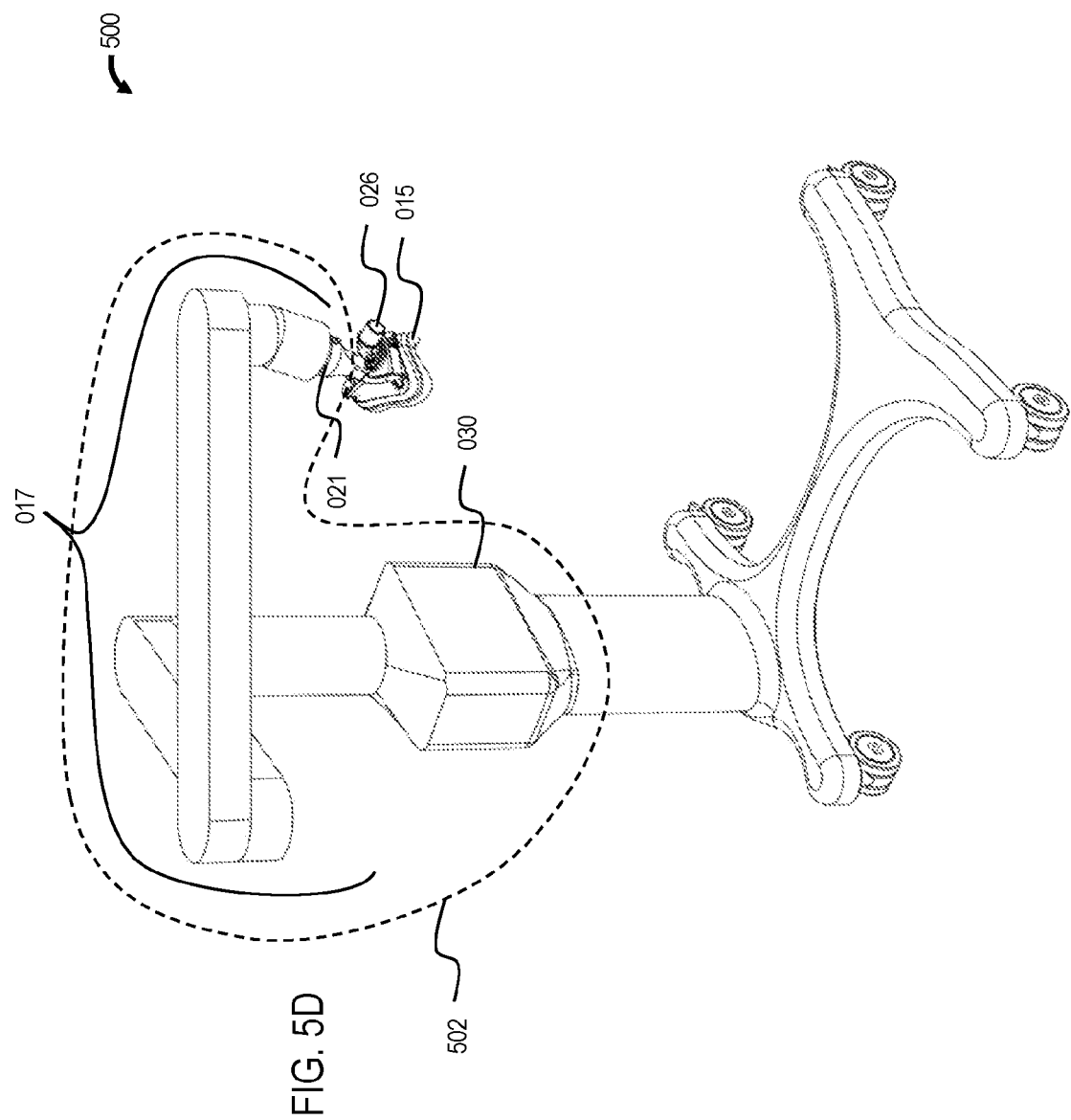

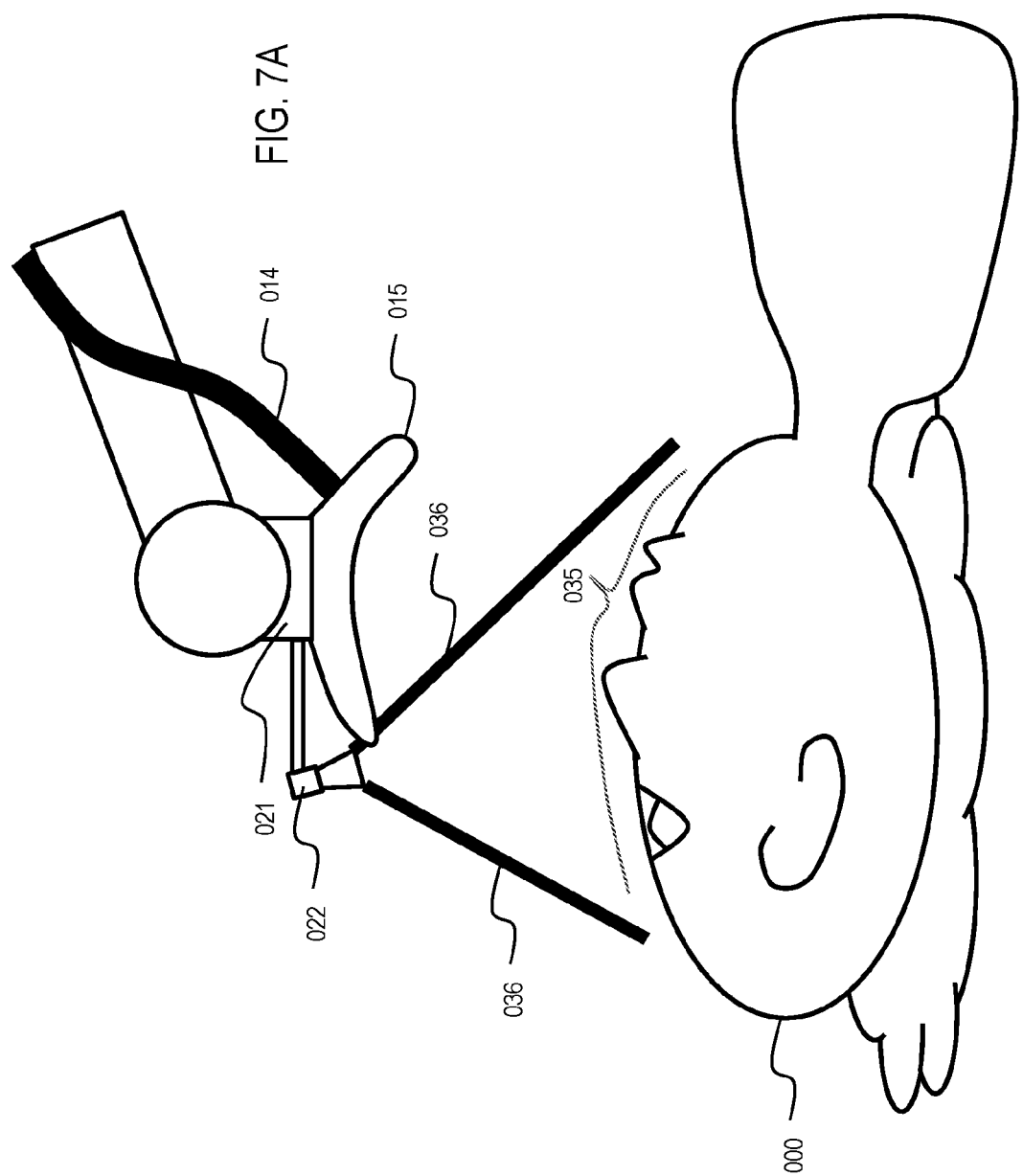

AUTOMATIC PLACEMENT OF A MASK

CROSS REFERENCE TO RELATED APPLICATION

The present claims the benefit of priority to U.S. Provisional Application No. 62/933,620, filed on Nov. 11, 2019, entitled "Apparatus and Method for Automatic Placement of a CPAP Mask," which is hereby incorporated by reference herein in its entirety.

BACKGROUND

Field of the Disclosure

The present disclosure relates to medical systems, devices, and methods, and more specifically to systems, devices, and methods for automatic placement of a mask.

Description of the Related Art

Positive airway pressure (PAP) and related PAP therapies may include the application of PAP applied to a user's airway while breathing, for example at night, specifically while sleeping. The PAP can be generated by a ventilator unit (sometimes referred to as "ventilator") located nearby to the user, or from an alternative suitable source, and can be supplied to the user via a ventilator mask (sometimes referred to as "mask") and gas tube, permitting the flow of gas directly to the user's nose and/or mouth via the mask. The ventilator, gas tube, and the mask are commonly referred to as a 'PAP system' or 'PAP device'. Examples of PAP systems or devices include continuous PAP (CPAP) systems or devices, variable PAP (VPAP) systems or devices, bilevel PAP (BPAP) systems or devices, automatic PAP (APAP), and/or other sleep apnea ventilator systems or devices.

There are many types of masks available in different shapes and sizes to accommodate various preferences and/or needs of different users. Some versions of the masks only cover a user's mouth, while others only cover a user's nose, while others cover both a user's mouth and nose. Masks can require an effective seal against a face of the user during use to ensure delivery of correctly pressurized gas. The seal is typically facilitated with some type of inflated bladder or soft, deformable material along the mask edges which can conform to the face of the user. Constant compression forces may be needed to react pressurized air forces from the face of the user and to slightly compress the seal of the mask; this can be achieved with the use of head straps. The head straps are typically available in numerous variations, such as head chin straps, full head straps, and over-head straps to accommodate various preferences and/or needs of different users.

An alternative to the mask is a deformable nasal plug or plugs that permit the delivery of pressurized gas without a mask. These systems/devices typically require the user to insert the plugs manually into each nostril prior to use. The nasal plugs can be attached to a small housing connected to the gas tube. Although smaller and less intrusive on the face of the user, this type of air delivery may not always work well for users who breathe via their mouth.

When used properly, PAP and related PAP therapies can prevent apnea events and hence the associated conditions resulting from obstructive sleep apnea. Unfortunately, many users do not use the equipment as prescribed and some completely abandon usage altogether. Numerous reasons have been cited for this non-compliance, and include mask leakage, improper mask/strap fit, discomfort due to mask and/or straps, disturbed sleep due to the presence of the mask and/or PAP system/device, claustrophobia from the mask, semi-conscious removal of the mask, anxiety due to the presence of the mask, and/or the like.

Failure to comply with the prescribed PAP treatment regimen is associated with many health problems, including chronic daytime sleepiness, daytime fatigue, cognitive dysfunction, sexual dysfunction, hypertension, heart attacks, strokes, cardiac arrhythmias, and/or the like. Non-compliance can be reported to driver license bureaus and the driver license of non-complying users can be revoked as a result thereof.

Despite the known physiological and psychological health problems, non-compliance is an issue. Thus, there is a long-felt need to improve current PAP therapy delivery methods and related systems/devices. More specifically, there exists a need to address issues related to non-compliance, such as mask fit and leakage, discomfort, claustrophobia, anxiety from usage, and semiconscious mask removal, by way of automatically placing a mask on a user, applying the needed sealing force in-situ, and maintaining the correct placement and sealing force while the user sleeps.

BRIEF DESCRIPTION OF THE DRAWINGS

FIGS. 5A-5D illustrate a robotic arm system, according to some embodiments.

FIGS. 7A-7C illustrate fields of views of a computer vision system, according to some embodiments.

The figures depict various embodiments for purposes of illustration only. One skilled in the art will readily recognize from the following discussion that alternative embodiments of the structure and methods illustrated herein may be employed without departing from the principles described herein.

SUMMARY

A robotic arm system can include a robot including a robot flange, a mask coupled to the robot flange, a ventilator coupled to the mask, and one or more controllers operable to change a pose of the robot flange. The controllers are further operable to deliver gas from the ventilator to the mask. The robot can include the ventilator. The robotic arm system can include a gas tube coupled to the mask and the ventilator, wherein the gas tube is configured to carry gas between the ventilator and the mask. The robotic arm system can include a computer vision system, one or more biometric sensor systems, and/or a sensing system. The ventilator can be a positive airway pressure ventilator. The mask can be a nasal mask, a mouth mask, or a face mask.

DETAILED DESCRIPTION

Figure 1:
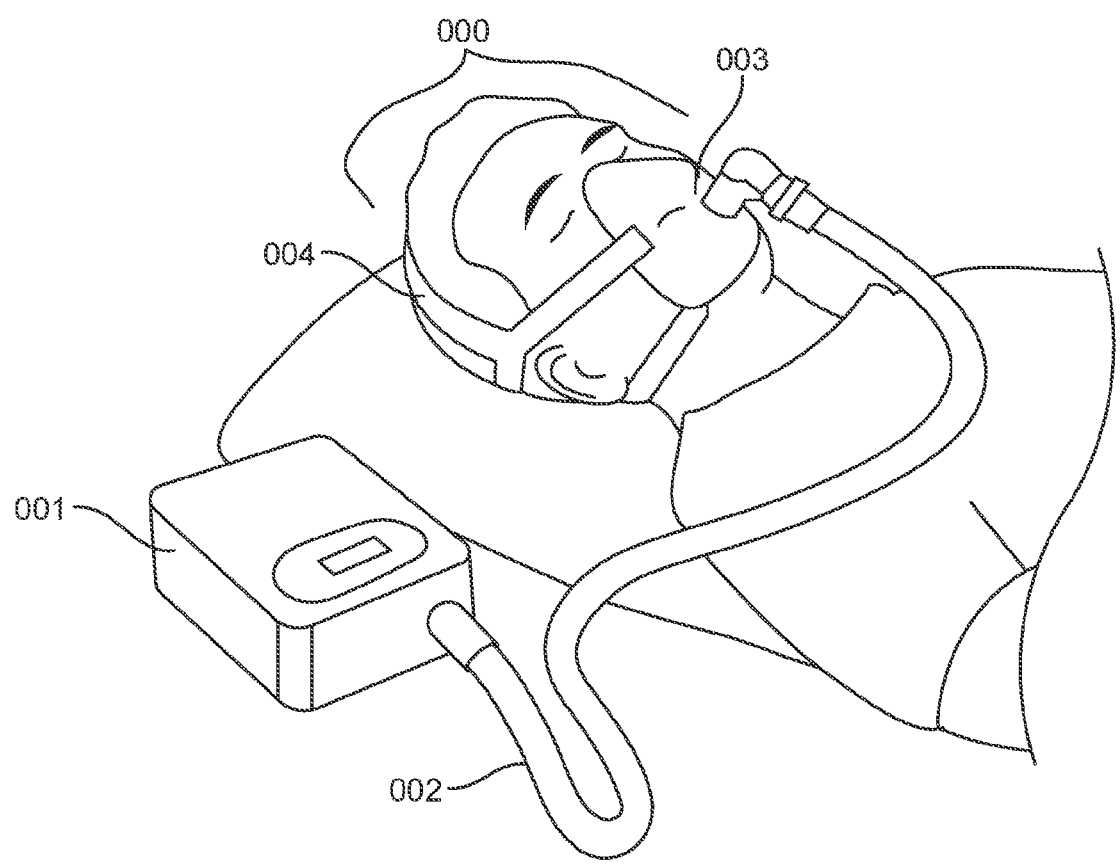
FIG. 1 illustrates a positive airway pressure (PAP) and related obstructive sleep apnea (OSA) treatment system and related components, according to some embodiments.

FIG. 1 illustrates a positive airway pressure (PAP) and related obstructive sleep apnea (OSA) treatment system and related components, according to some embodiments. Examples of PAP systems include continuous PAP (CPAP), bilevel PAP (BPAP), and automatic PAP (APAP). Patient/user 000 is shown adjacent to ventilator unit 001 (sometimes referred to as "ventilator 001") connected to an air supply hose 002 (sometimes referred to as "gas tube 002") which in turn connects to a ventilator mask 003 (sometimes referred to as "mask 003"). The mask 003 is secured to the patient/user 000 via head straps 004.

Figure 2:
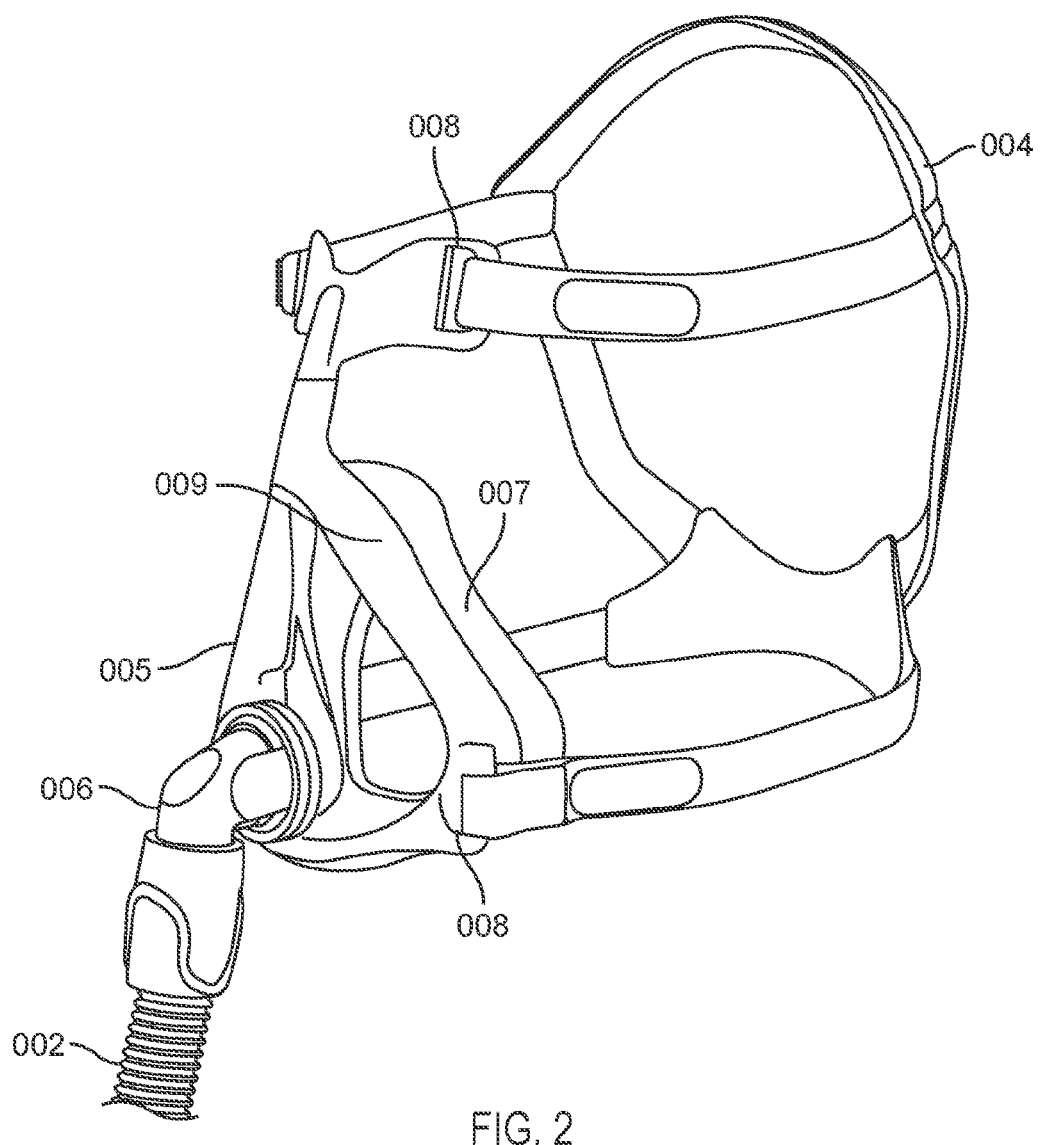
FIG. 2 illustrates a full-face mask, according to some embodiments.

FIG. 2 illustrates a full-face mask, according to some embodiments. The full-face mask includes a rigid housing 005 with connection 006 (sometimes referred to as "opening 006") for an air supply hose 002. Contact edges 009 of the rigid housing 005 are covered with a soft deformable seal 007. The rigid housing 005 contains features 008 to permit attachment of the head straps 004.

Figure 3:
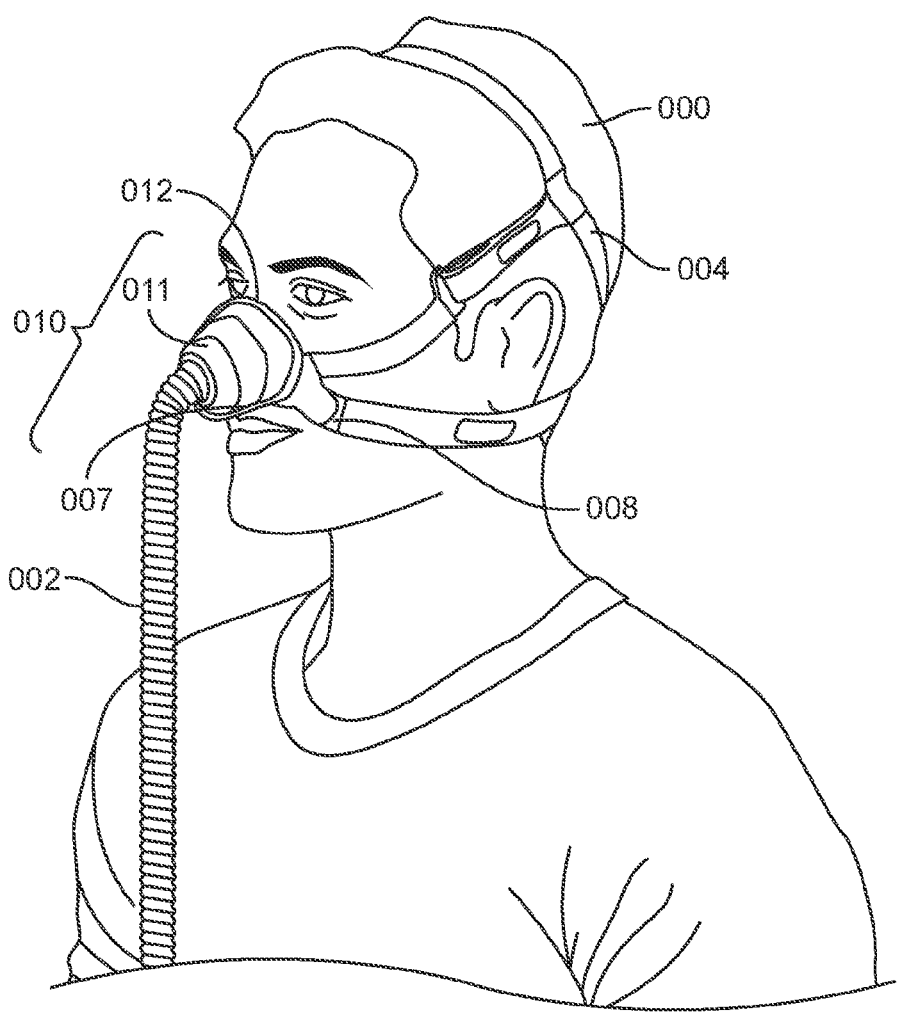
FIG. 3 illustrates a nose-only mask, according to some embodiments.

FIG. 3 illustrates a nose-only mask 010, according to some embodiments. The nose-only mask 010 includes a nose-only rigid housing 011, attachment points 008 (sometimes referred to as "features 008") for straps (sometimes referred to as "head straps 004"), and an air supply hose 002 (sometimes referred to as "gas tube 002") connection. Contact edges of the nose-only rigid housing 011 are covered with a soft deformable seal 007. The nose-only mask 010 is designed to cover only a nose 012 of the patient/user 000.

The present disclosure, in some aspects, relates generally to assistive sleep devices. More particularly, some aspects are related to PAP, for example CPAP, BPAP, APAP, therapy, systems, machines/devices and equipment typically used by individuals diagnosed with Obstructive Sleep Apnea (OSA) and/or related disorders, and the like.

The disclosure provides examples of solutions by describing an apparatus/system and teaching a method for automatic placement and for proper force application of a ventilator mask (sometimes referred to as "mask") onto a face of a patient/user, and maintaining the proper placement and force application of the mask while the patient/user sleeps and moves.

In some embodiments, a robotic arm has the mask operatively coupled to its distal end, and a robotic arm base (e.g., referred to as "robot base") is placed bedside to the patient/user. The reach and dexterity of the robotic arm can allow for automatic placement and for proper force application of the mask onto the face of the patient/user while the patient/user lies in bed and/or moves during sleep.

In some embodiments, the distal end of the robotic arm is also operatively coupled to a computer vision system that views the face of the patient/user and optically tracks needed facial features, in real-time, to cause a robot/the robotic arm to maintain correct alignment of the mask with the face of the patient/user.

In some embodiments, a biometric monitoring system can measure and analyze signals of the patient/user to determine a sleep state of the patient/user in real-time, and can cause the robotic arm to position and orient the mask after the patient/user has entered a specified sleep state.

In some embodiments, a biometric monitoring system is operatively coupled to a ventilator unit (sometimes referred to as "ventilator") that is attached to the mask, and can automatically enable and disable the application of pressurized ventilator air/gas based on the sleep state of the patient/user, in real-time.

In some embodiments, the distal end of the robotic arm can include a radio frequency identification device (RFID) reader capable of reading a corresponding RFID tag embedded into the mask. The RFID reader can be operatively coupled to a system controller.

In some embodiments, there can be an RFID reader, operatively coupled to the system controller, located adjacent to the ventilator which can be capable of reading a corresponding RFID tag embedded into the air supply hose.

In some embodiments, a robot flange of the robotic arm can be operatively coupled to a nasal plug device, (e.g., instead of a mask). The robotic arm can place plugs of the nasal plug device into or onto nostrils of the patient/user automatically.

In some embodiments, tracked features of the patient/user can be observed using a computer vision based approach. In some embodiments, tracked facial features of the patient/user can be observed using a noncomputer vision based approach, such as radar, LIDAR, ultrasound, or any other suitable spatial measuring method.

These and other aspects, features, and advantages will become more readily apparent from the drawings and the detailed description, which follow.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, and/or brief summary of the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In some embodiments, a ventilator unit 013 (sometimes referred to as "ventilator 013") can be connected to a pressurized air supply tube 014 (sometimes referred to as "gas tube 014") that can be connected to a ventilator mask 015 (sometimes referred to as "mask 015"). Adjacent to the ventilator unit 013 can be a robot base 016 of a robotic arm 017. The robotic arm 017 can be controlled by a robot controller (not shown) 018 which can in-turn be controlled by a system controller (not shown) 019. The system controller 019 can be operatively coupled to the ventilator unit 013 via an electrical interface 020. The electrical interface 020 can be wired (as shown) or wireless. The ventilator mask 015 can be operatively coupled to a distal end of the robotic arm 017 via the distal robot flange 021 (sometimes referred to as "robot flange 021"). Additionally, a robot attached computer vision system 022 can be operatively coupled to the distal robot flange 021 and can be connected to the system controller 019 via an electrical interconnect 023. The electrical interface 023 can be wired (as shown) or wireless. An additional non-robot mounted biometric sensor system 024 (sometimes referred to as "patient attached biometric sensor system 024") can be operatively coupled to the system controller 019 via an electrical interface 025, or the like. The electrical interface 025 can be wired (as shown) or wireless.

Figure 13:
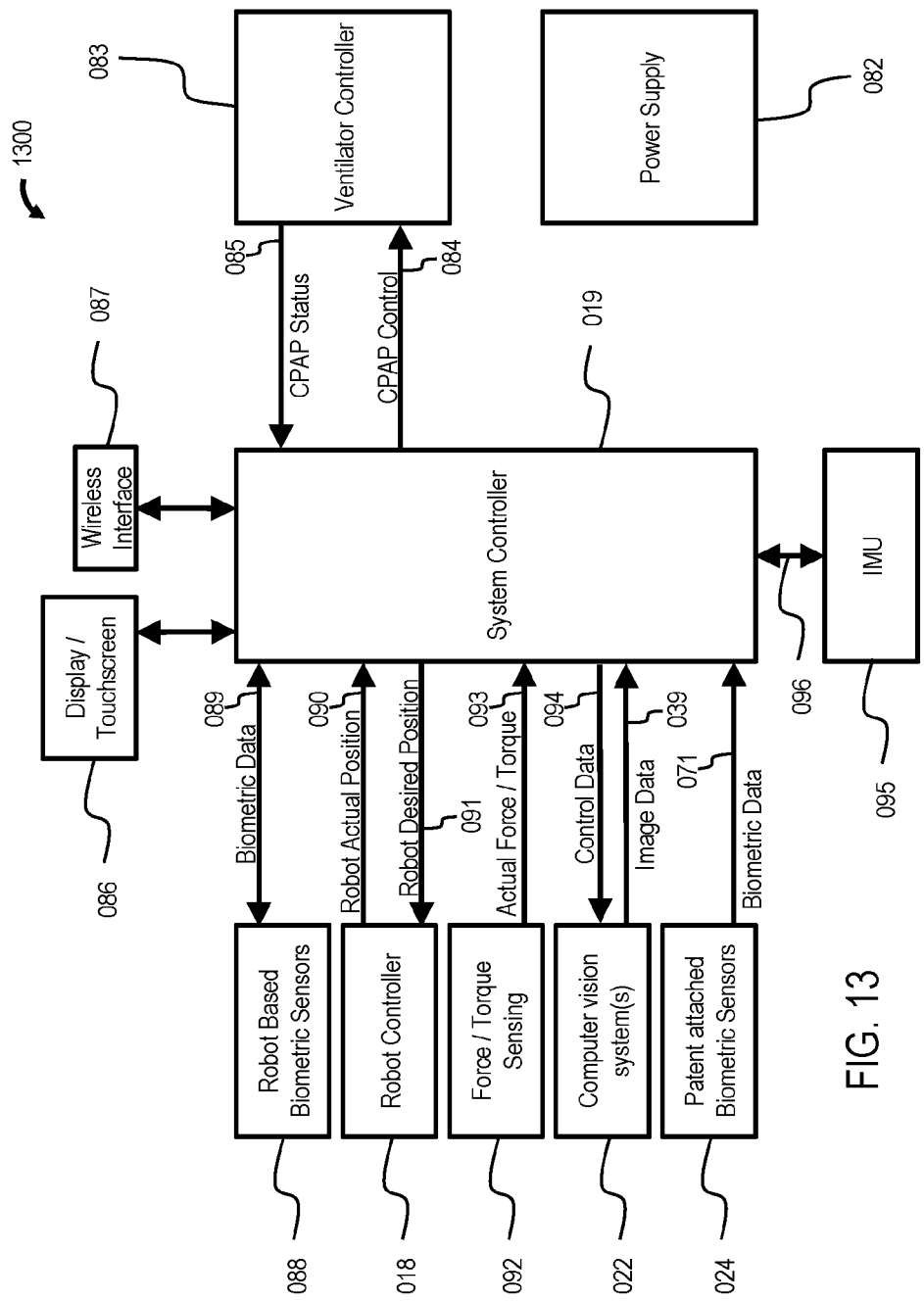
FIG. 13 illustrates a block diagram of a robotic arm system, according to some embodiments.

Continuing with internal details of a possible block diagram of the present system, refer to the example embodiment shown in FIG. 13. In this example, a power supply 082 can supply power to some or all system components via electrical connections (not shown). Main system controller 019 can electrically interface to the ventilator controller 083 via electrical interface signals 084 and 085. The system controller 019 can transmit and receive wireless data via the wireless interface 087. The patient/user 000 can control and interact with the system via the display/touchscreen interface 086 or through the wireless interface 087, or the like. The robot based biometric sensors 088 can connect to the system controller 019 via an electrical interface 089.

The robot controller 018 can receive and send data via electrical interfaces 090 and 091. The robotic arm 017 (not shown) can be controlled by the robot controller 018, and can have integrated joint torque/force sensors 092 (sometimes referred to as "sensing system 092") that can send data 093 to the system controller 019. Computer vision system 022 can send image data 039 to the system controller 019. Computer vision system control data 094 can also be sent from the system controller 019 to the computer vision system 022. Patient attached biometric sensors 024 can be connected via a wired interface 071 or a wireless interface 069 to send biometric data to the system controller 019. In some embodiments, the patient attached biometric sensors 024 can be connected via an interface 025 to send biometric data to the system controller 019. An integrated discrete inertial measurement unit (IMU) 095, or subcomponents of an IMU 095, can be electrically interfaced via connection 096.

Figure 10:
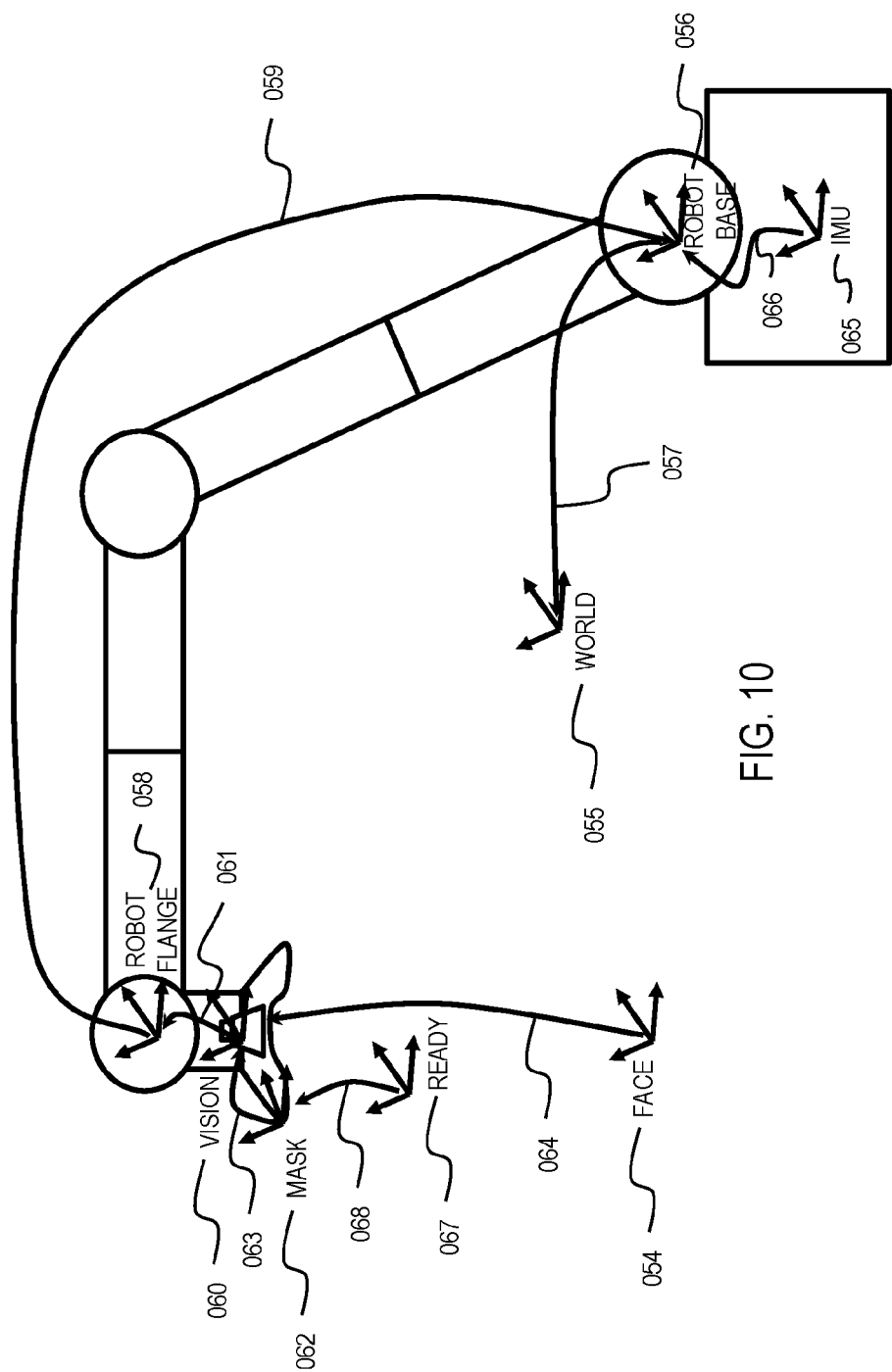
FIG. 10 illustrates one or more system coordinate frames, according to some embodiments.

FIG. 10 illustrates system coordinate frames of some embodiments. In the example of FIG. 10, the WORLD coordinate frame 055 can represent the environment reference, and the ROBOT BASE frame 056 can be arbitrarily placed with respect to this WORLD frame 055, and can be defined by spatial relationship 057. The ROBOT FLANGE frame 058 can be defined by spatial relationship 059 with respect to the ROBOT BASE frame 056. The computer vision system 022 coordinate frame VISION 060, can be defined with respect to the ROBOT FLANGE coordinate system 058 by spatial relationship 061. The MASK coordinate frame 062 can be defined with respect to the computer vision system 022 coordinate frame VISION 060 by spatial relationship 063. Additionally, the FACE coordinate frame 054 can be defined with respect to the computer vision system 022 coordinate frame VISION 060 by spatial relationship 064. Also, the IMU coordinate frame 065 can be in a known spatial relationship 066 with respect to the ROBOT BASE frame 056. Finally, the READY coordinate frame 067 can be defined with respect to the MASK coordinate frame 062 by spatial relationship 068.

The robotic arm 017 can have the capability of automatically positioning and orienting a distal flange 021, with respect to the most proximal robotic arm component, the robot base 016. The robot controller 018 can command the robotic arm 017 to move in such a way that the six degree of freedom pose (position and orientation) of the robot flange 021 can be controlled and known with respect to the robot base 016. For example, the spatial relationship 059 of the ROBOT FLANGE coordinate frame 058 with respect to the ROBOT BASE coordinate frame 056 can be explicitly controlled by the robot controller 018.

Prior to initial use, in some embodiments, some of the components of the system can undergo a calibration process to accurately measure some key spatial relationships of the system. These measured relationships can be stored in the internal non-volatile memory of the system controller 019 and retrieved for later use. For example, the spatial relationship 066 of the IMU coordinate frame 065 with respect to the ROBOT BASE frame 056 can be measured and stored. Similarly, the robotic arm 017 can be calibrated to ensure that the spatial relationship 059 of the ROBOT FLANGE coordinate frame 058 is known accurately with respect to the ROBOT BASE frame 056. Additionally, the spatial relationship 061 of the machine vision coordinate frame VISION 060 with respect to the ROBOT FLANGE coordinate frame 058 can be accurately measured and stored. Additionally, a nominal coordinate frame corresponding to the READY frame 067 and corresponding spatial relationship 068 with respect to the MASK frame 062 can be 'taught' to the system.

Figure 11:
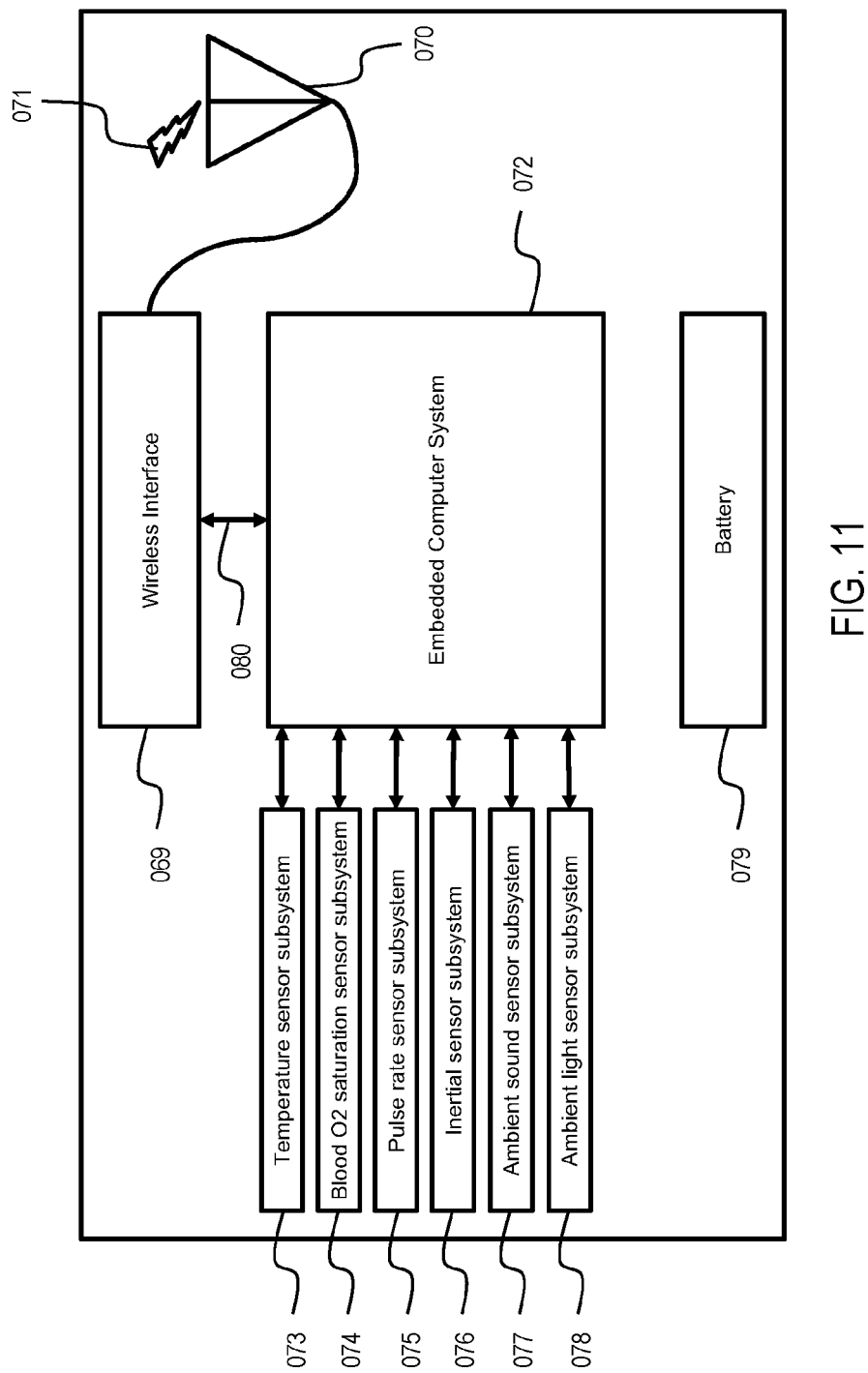
FIG. 11 illustrates a block diagram of a patient attached biometric sensor system, according to some embodiments.
Figure 12A:
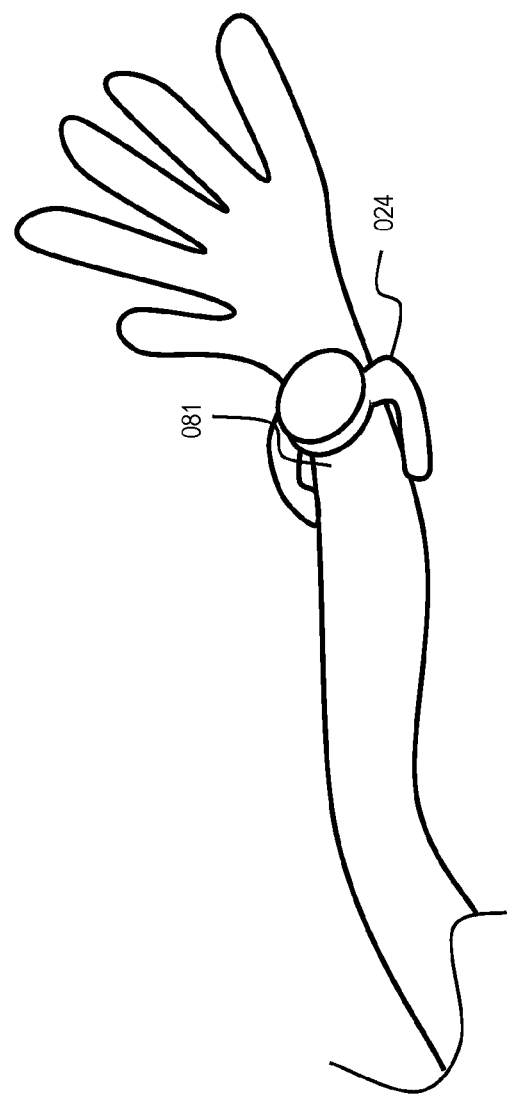
FIGS. 12A and 12B illustrate a patient attached biometric sensor system 024, according to some embodiments.
Figure 12B:
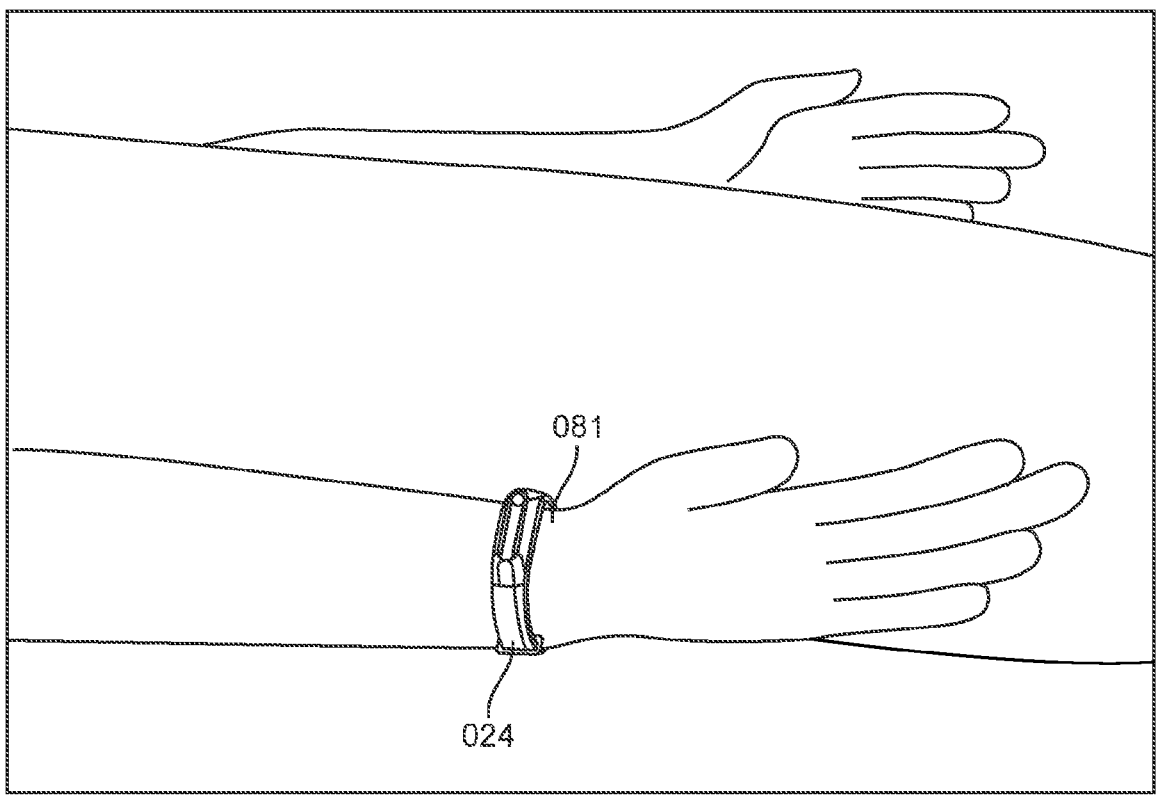

A use case is shown in FIGS. 6A-6D where an embodiment 031/400/500 is resting on a night stand 032 and both are adjacent to patient/user 000 lying in a supine position on a bed 033. In some embodiments, prior to the patient/user 000 lying in the bed 033, the patient/user 000 will put a patient attached biometric sensor system 024 on their wrist and secure it in a manner similar to a wrist watch, as shown in FIGS. 12A and 12B. A block diagram of a possible example patient attached biometric sensor system 024 is shown in FIG. 11. Block 069 represents a wireless interface connected to antenna 070 for transmitting and receiving data 071. The wireless interface can be connected to an embedded computer system 072, via connection 080, which can be connected to numerous sensor sub-systems, including one or more of a temperature sensor subsystem 073, a blood oxygen saturation sensor subsystem 074, a pulse rate sensor subsystem 075, an inertial sensor subsystem 076, an ambient sound sensor subsystem 077, and/or an ambient light sensor subsystem 078. A battery 079 can power this patient-attached sensor system 024.

Upon initial power up, the system can enter a 'BOOTING' state 098 to initialize needed subsystems as shown in the example of FIG. 13. Upon boot completion, the system can transition to an 'IDLE' state 099 and can remain in this state until the patient/user 000 initiates a transition to a 'READY' state 100. This transition can be triggered by the patient 000 pressing a button on the touchscreen interface 086 or via the wireless interface 087 or the like. In the 'READY' state 100, the system controller 019 can command the robot controller 018 to position the robotic arm flange 021 to be located and oriented in a READY pose, corresponding to the coordinate frame 067 above a face 035 of the patient/user 000 as shown in the example of FIGS. 6C and 7A. The robot attached computer vision system 022 can then have the face 035 of the patient/user 000 within its field of view 036.

After the robotic arm 031 reaches the READY pose 067, the system can transition into a 'WAIT FOR SLEEP' state 101 where it can begin monitoring the biometric sensor system 024, or the like, and corresponding output data 071. This can include one or more of the temperature signal 108 from the temperature subsystem 073, the blood oxygen saturation signal 109 from the blood oxygen saturation subsystem 074, the pulse rate signal 110 from the pulse rate sensor subsystem 075, the inertial signals 111 and 112 from the inertial sensor subsystem 076, the sound signals 113 from the sound sensor subsystem 077, the ambient light signals 114 from the ambient light sensor subsystem 078, and the like.

Figure 16:
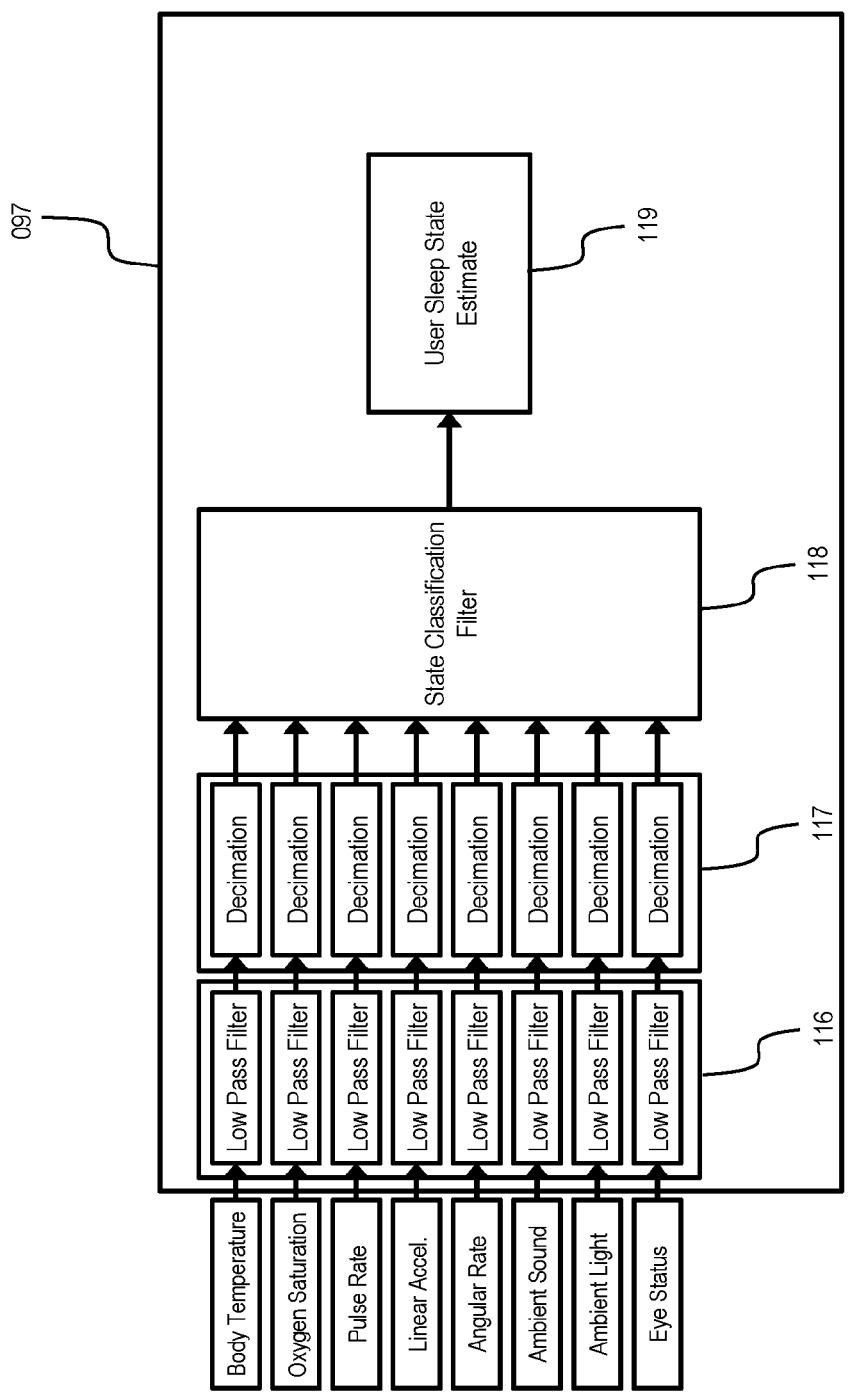
FIG. 16 illustrates a sleep detection method, according to some embodiments.

The signals 108, 109, 110, 111, 112, 113, 114, and 115 can be fed into the sleep detection method 097, as shown in the example of FIG. 16. The 'Eye Shut' signal 115 can be obtained from the output of the image processing block 046. The signals can pass through a multichannel low pass filter block 116, and can then continue into a multichannel decimation block 117, and can then continue into a state classification block 118 which can process the signals to obtain an estimated sleep state 119 of the patient/user 000.

In some embodiments, when the estimated patient sleep state 119 has reached a suitable sleep level, the state machine can transition into the 'SLEEP' state 102, and can begin reading needed data from the image processing algorithm 038. Image data 039 captured from the robot mounted computer vision system 022 can be processed in the system controller 019.

Figure 8:
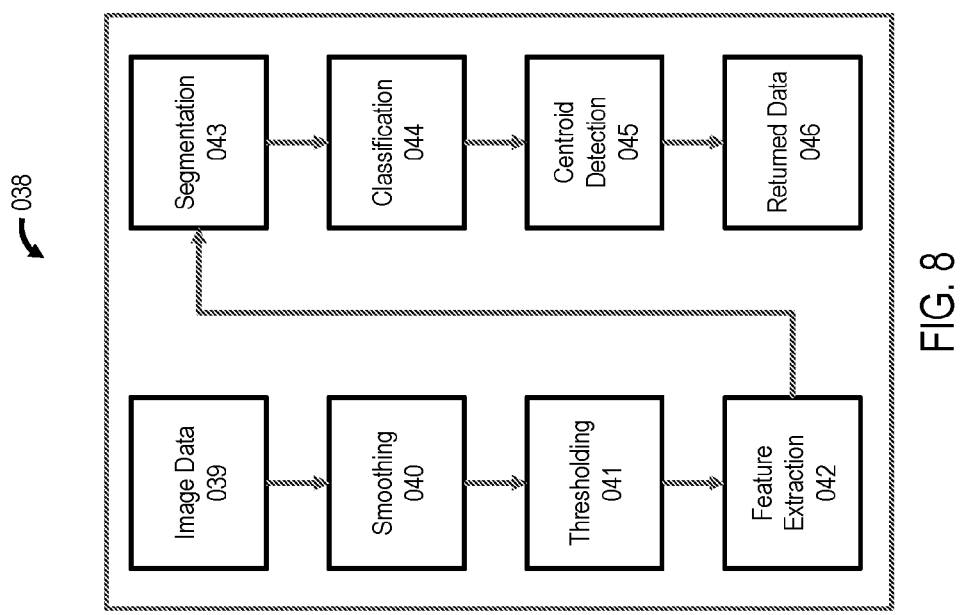
FIG. 8 illustrates an image processing method, according to some embodiments.
Figure 9:
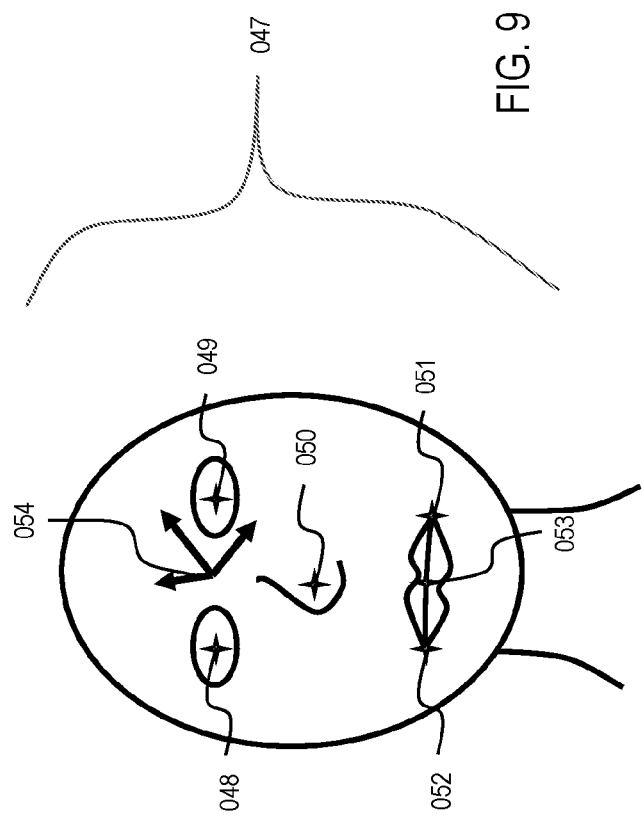
FIG. 9 illustrates a face image including labeled key points of interest, according to some embodiments.

An example of an image processing method 038 is presented in FIG. 8, according to some embodiments. Image data 039 can be filtered using a spatial smoothing sub-algorithm 040 before being fed into a data thresholding step 041. After the data is thresholded, feature extraction 042 can be performed and can then be segmented as shown in step 043. The segmented data can be classified by sub-algorithm 044. The centroid detection sub-algorithm 045 can be run on the classified data set from 044, and the centroid data set 046 output from the centroid detection sub-algorithm 045 can contain labeled key points of interest. Referring to FIG. 9, in various embodiments, the face feature points or groups of points of interest can include, but are not limited to, eye center points 048 and 049, nose center point 050, mouth lateral points 051 and 052, and the mouth center point 053. Additionally, the points can be used to create a face coordinate system 054, which can be stored in the system controller 019 for possible later retrieval and can set the state of the system controller 019 and can visually guide the robot 031.

In some embodiments after the face features are identified, the state machine can transition into the 'APPROACH' state 103, and robotic arm 031 can move to allow the robot flange 021 and corresponding operatively coupled mask 015 to move towards the face 035 of the patient/user 000. This movement can continue until the mask 015 makes contact with the face 035 of the patient/user 000. The contact event can be detected by the system controller 019 by monitoring the robot force/torque sensors 092. In some embodiments, once the appropriate force is detected, the system can transition into the 'SEATED' state 104 which can indicate that the pressurized air from the ventilator unit 013 can be delivered to the patient 000 via the pressurized air supply tube 014 and mask 015. The system can then transition to the 'FACE FORCE CONTROL' state 105 where the system controller 019 can command the robotic arm 031 via the robot controller 018 to maintain the appropriate contact force and face position with respect to the patient's face 035. This control of the force and position is typically known to those skilled in the art as 'hybrid position/force control'. This can allow the patient/user 000 to move while the robotic arm 031 can continuously move and adjust to apply the appropriate contact force in the correct position and direction against the face 035 of the patient/user 000. The controlled movement can be designed to permit a safe and effective contact engagement with the face 035 of the patient/user 000.

In some embodiments, if the patient/user 000 awakens or moves in a manner such that the mask 015 does not maintain the correct force or position, a transition to the 'RETRACT' state 106 can occur and the robotic arm 031 can move the mask 015 away from the face 035 of the patient/user 000. If the patient/user 000 is still asleep, based on the status of the estimated sleep state 119 of the patient/user 000, then the 'APPROACH' state 103 can be entered again, where the aforementioned state transition cycle can repeat. However, in some examples, if the patient/user 000 is awake, the 'WAIT FOR SLEEP state 101 can be entered, and the aforementioned state transition cycle can repeat.

In some embodiments, if an error is detected, the state 'ERROR' 107 can be entered, indicating a system error condition. In some examples, the patient/user 000 can abort the possibility of a transition into 'SLEEP' state 102, while in the 'WAIT FOR SLEEP' state 101, by pressing an 'abort' button on the touch screen interface 086 or wireless interface 087, or the like. In some examples, at any time, while in any state except the 'ERROR' state, the abort button can cause a transition to the 'IDLE' state 099.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

Figure 4:
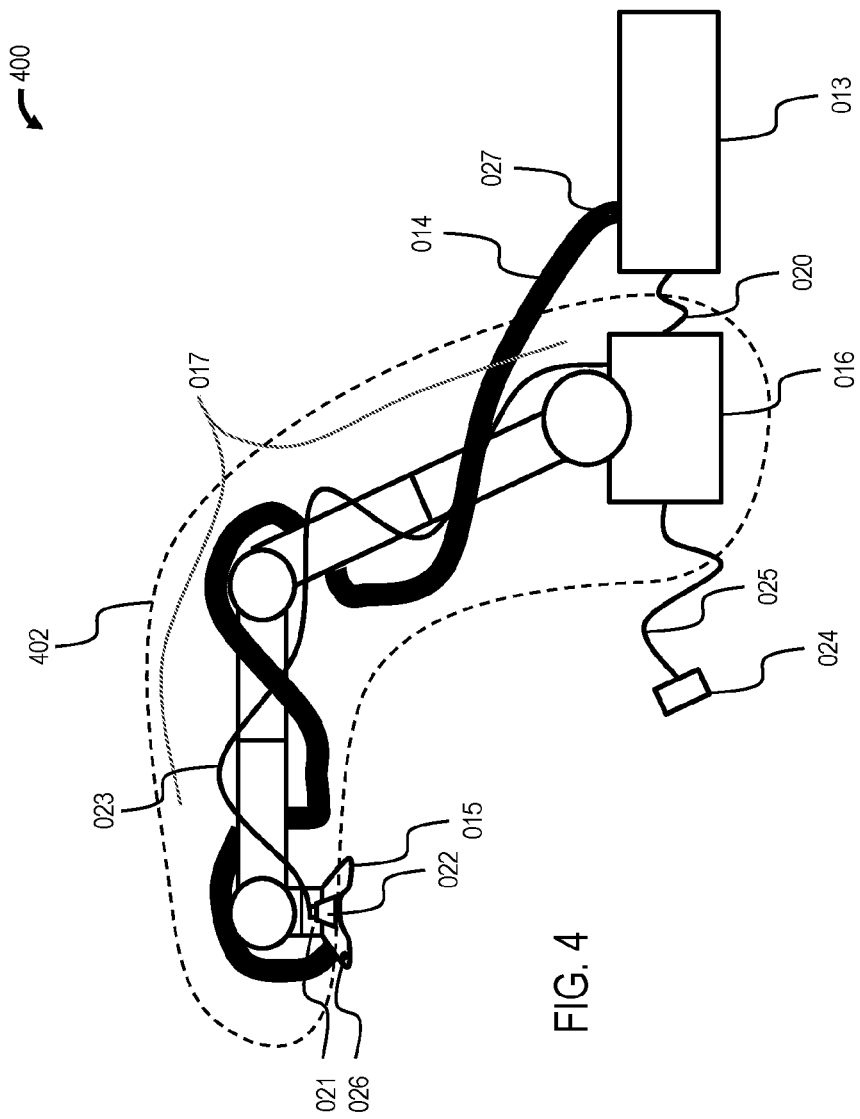
FIG. 4 illustrates a robotic arm system, according to some embodiments.

FIG. 4 illustrates a robotic arm system 400 (sometimes referred to as "system 400"), according to some embodiments. The system 400 includes one or more components/sub-systems. The system 400 includes a ventilator unit 013 (sometimes referred to as "ventilator 013" or "flow generator 013"), a pressurized air supply tube 014 (sometimes referred to as "gas tube 014"), a ventilator mask 015 (sometimes referred to as "mask 015"), a robot 402, and a patient attached biometric sensor system 024 (sometimes referred to as "user attached biometric sensor system 024"). The robot 402 includes a robot base 016, a robotic arm 017, and a distal robot flange 021 (sometimes referred to as a "robot flange 021"). In some embodiments, the system 400 includes one or more speakers and/or one or more microphones. The system 400 can be associated with one or more system states. Examples of system states are described in detail with respect to FIG. 14.

In some embodiments, for example as illustrated in FIGS. 5A-5D, the ventilator is a part of/integrated with the robot base, together referred to as a unified system base. FIGS.

Figure 5A:
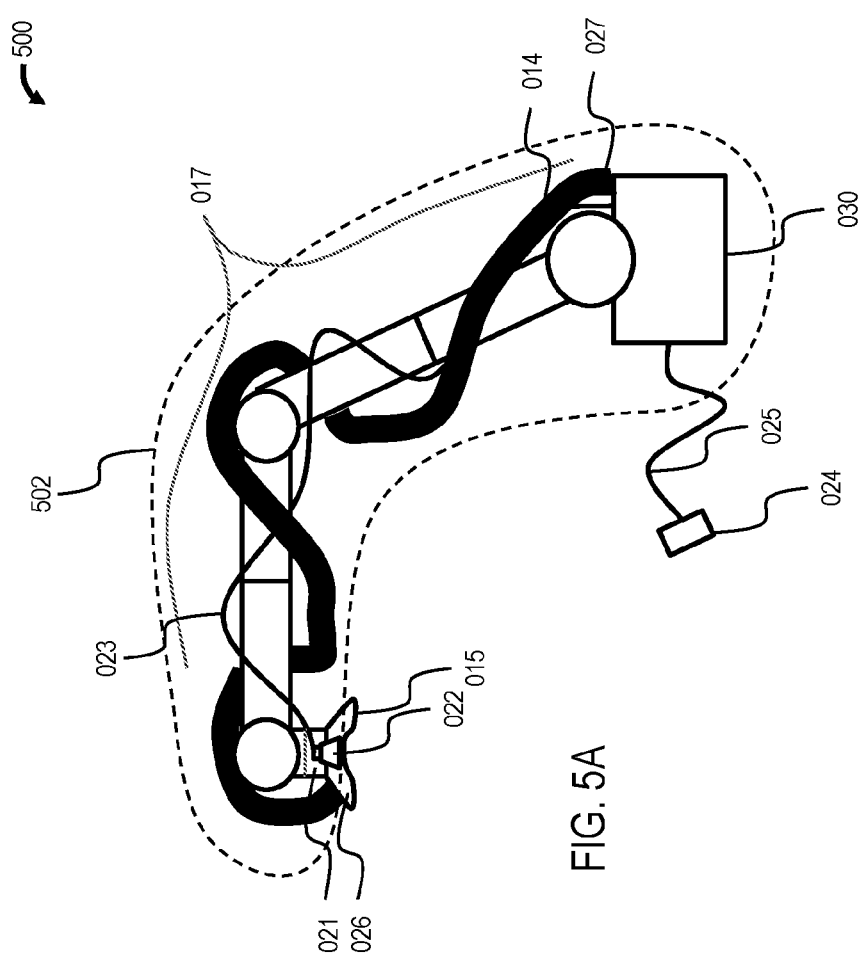
Figure 5B:
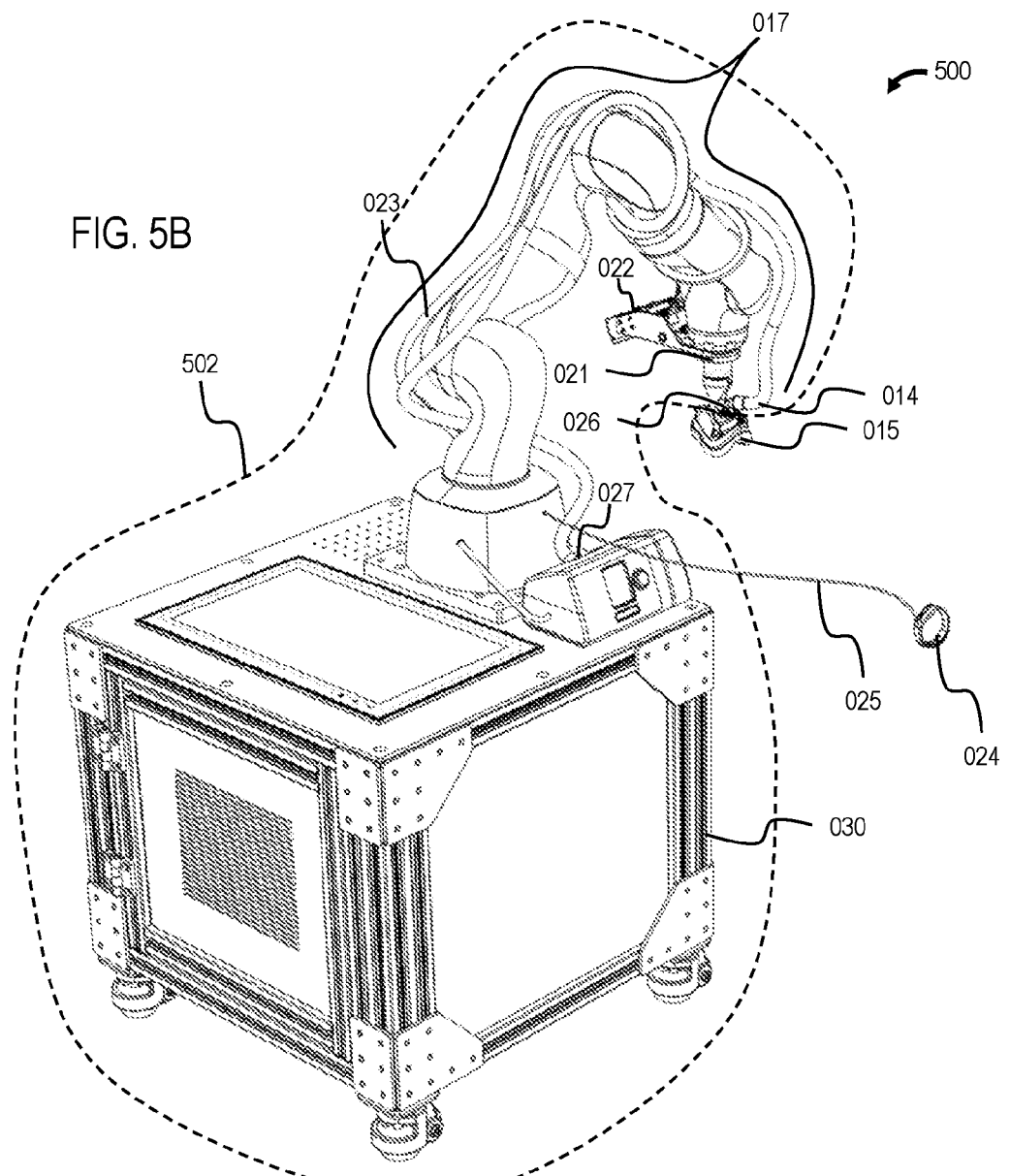
Figure 5C:
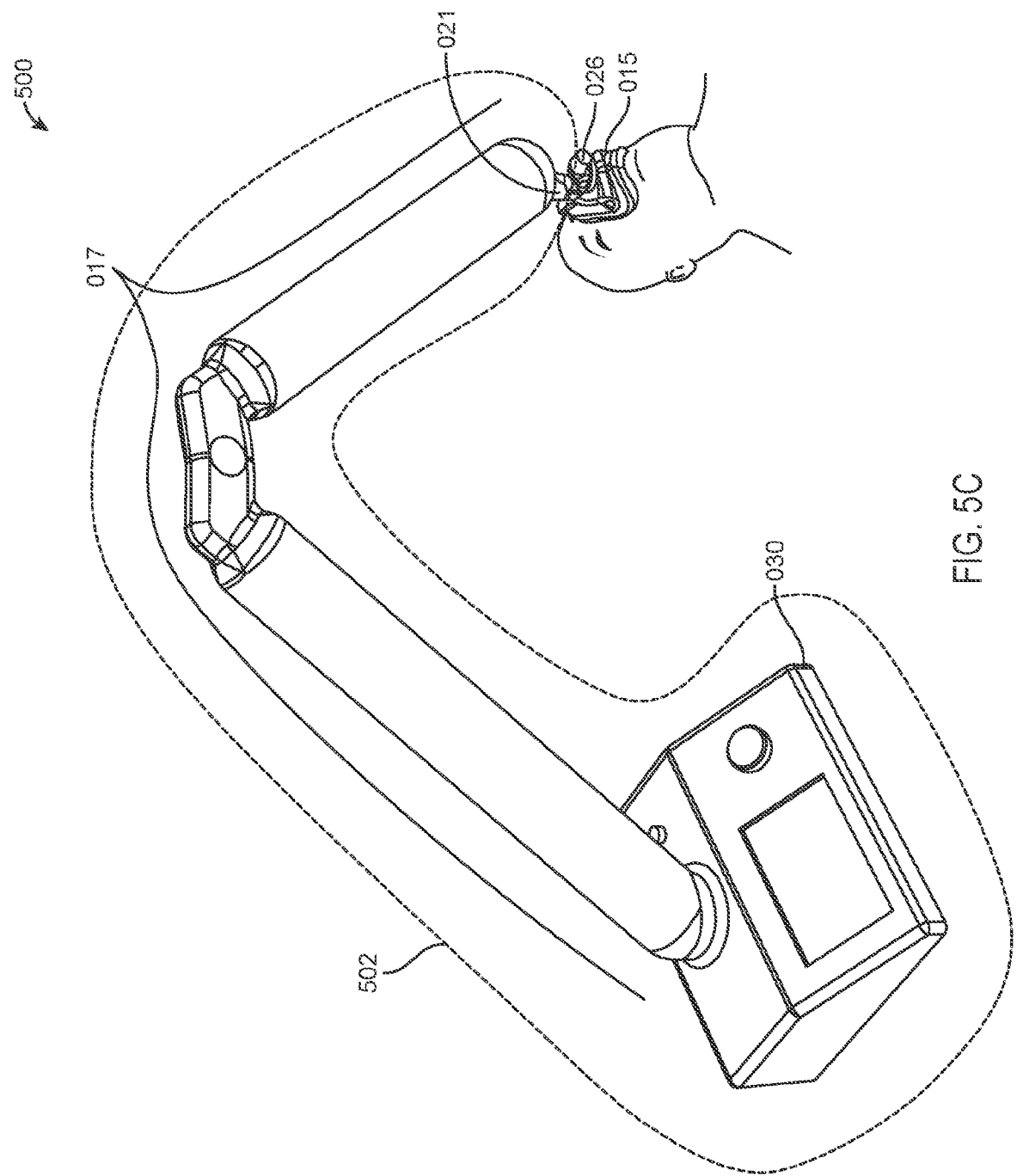

5A-5D illustrate a robotic arm system 500 (sometimes referred to as "system 500"), according to some embodiments. The system 500 includes one or more components/sub-systems. The system 500 includes the gas tube 014, the mask 015, a robot 502, and the patient attached biometric sensor system 024. The robot 502 includes a unified system base 030, the robotic arm 017, and the distal robot flange 021 (sometimes referred to as "robot flange 021"). The unified system base 030 includes a ventilator (e.g., the ventilator 013) and a robot base (e.g., the robot base 016). In some embodiments, the system 500 includes one or more speakers and/or one or more microphones. The system 500 can be associated with one or more system states. Examples of system states are described in detail with respect to FIG. 14. FIGS. 5A and 5C illustrate a robotic arm system 500 that can be on a nightstand, according to some embodiments. FIG. 5B illustrates a robotic arm system 500 that can be implemented in/as a nightstand, according to some embodiments. FIG. 5D illustrates a robotic arm system 500 that can be a mobile unit on one or more wheels, according to some embodiments.

The ventilator 013 moves gas into and/or out of a user, for example, through the gas tube 014. The gas can include, for example, air, oxygen, and the like. In some embodiments, the ventilator 013 includes a ventilator controller (e.g., ventilator controller 083 described in detail with respect to FIG. 13) including one or more embedded systems including one or more processors that enable customized delivery of gas through monitoring of one or more parameters such as, for example, pressure, volume, air flow, air leakage, power levels, and the like.

In some embodiments, the ventilator 013 can be a positive airway pressure (PAP) ventilator. Examples of PAP ventilators include continuous PAP (CPAP) ventilators, variable PAP (VPAP) ventilators, bilevel PAP (BPAP) ventilators, automatic PAP (APAP) ventilators, and the like.

In some embodiments, for example as illustrated in FIG. 4, the ventilator 013 is a standalone device (with respect to the robot 402). In these embodiments, the ventilator 013 can enable customized delivery of gas through monitoring of parameters such as, for example, pressure, volume, air flow, air leakage, power levels, and the like. For example, a ventilator controller in the ventilator 013 can enable the customized delivery of gas through monitoring of parameters such as, for example, pressure, volume, air flow, air leakage, power levels, and the like.

In some embodiments, for example as illustrated in FIG. 4, the ventilator 013 is operatively and/or communicatively coupled to the robot 402 (e.g., the robot base 016) via an electrical interface 020 (sometimes referred to as "interface 020"). The interface 020 can be a wired interface or a wireless interface. In these embodiments, the robot 402 and/or the ventilator 013 can enable customized delivery of gas through monitoring of parameters such as, for example, pressure, volume, air flow, air leakage, power levels, heart rate, respiratory rate, temperature, blood oxygen saturation, ambient light, ambient sound, eye state (whether the eyes of the user are open or shut), and the like. For example, a system controller and/or a robot controller in the robot 402 and/or a ventilator controller in the ventilator 013 can enable customized delivery of gas through monitoring of parameters such as, for example, pressure, volume, air flow, air leakage, power levels, heart rate, respiratory rate, temperature, blood oxygen saturation, ambient light, ambient sound, eye state (whether the eyes of the user are open or shut), and the like.

In some embodiments, for example as illustrated in FIGS. 5A-5D, the ventilator is a part of the robot 502 (e.g., the unified system base 030). In these embodiments, the robot 502 can enable customized delivery of gas through monitoring of parameters such as, for example, pressure, volume, air flow, air leakage, power levels, heart rate, respiratory rate, temperature, blood oxygen saturation, ambient light, ambient sound, eye state, and the like. For example, a system controller and/or a robot controller in the robot 502 can enable customized delivery of gas through monitoring of parameters such as, for example, pressure, volume, air flow, air leakage, power levels, heart rate, respiratory rate, temperature, blood oxygen saturation, ambient light, ambient sound, eye state, and the like.

The system 400/500 can include a ventilator controller and a system controller. In some embodiments, the ventilator 013 can include the ventilator controller and the robot 402 (e.g., the robot base 016)/502 (e.g., the unified system base 030) can include the system controller. In some embodiments, the robot 402 (e.g., the robot base 016) can include both the ventilator controller and the system controller. In some embodiments, the robot 502 (e.g., the unified system base 030) can include both the ventilator controller and the system controller. An example ventilator controller (e.g., ventilator controller 083) and an example system controller (e.g., system controller 019) are described in detail with respect to FIG. 13.

As illustrated in FIG. 4, the ventilator 013 includes an opening through which the ventilator 013 couples to/interfaces with the gas tube 014, and as illustrated in FIGS. 5A and 5B, the robot 502 (e.g., the unified system base 030) includes an opening through which the robot (e.g., the unified system base 030) couples to/interfaces with the gas tube 014. In some embodiments, the aforementioned openings can include one or more sensors 027 (sometimes referred to as "ventilator sensors 027") and the system 400/500 can use sensor data from the sensors 027 to determine one or more factors regarding the gas tube 014. The sensor 027 can store the sensor data in a sensor database. In some embodiments, for example with reference to FIG. 4, the sensors 027 are coupled to the ventilator 013 and/or the robot 402 (e.g., the robot base 016). In some embodiments, for example with reference to FIGS. 5A and 5B, the sensors 027 are coupled to the robot 502 (e.g., the unified system base 030). Examples of the one or more factors regarding the gas tube 014 that the system 400/500 can determine are described in detail with respect to FIG. 13. In some embodiments, the sensors 027 read information from sensors in the gas tube 014.

The gas tube 014 can carry gas into and/or out of the user, for example by way of the mask 015. As illustrated in FIG. 4, the gas tube 014 is coupled/connected to the ventilator 013 and the mask 015, and couples/connects the ventilator 013 to the mask 015, and as illustrated in FIGS. 5A and 5B, the gas tube 014 is coupled/connected to the robot 502 (e.g., the unified system base 030) and the mask 015, and couples/connects the robot 502 (e.g., the unified system base 030) to the mask 015. For example, as illustrated in FIG. 4, the gas tube 014 can include one opening that couples/connects to the ventilator 013 and another opening that couples/connects to the mask 015. For example, as illustrated in FIGS. 5A and 5B, the gas tube 014 can include one opening that couples/connects to the robot 502 (e.g., the unified system base 030) and another opening that couples/connects to the mask 015. As illustrated in FIG. 4, the gas tube 014 carries gas between the ventilator 013 and the mask 015, and as illustrated in FIGS. 5A and 5B, the gas tube 014 carries gas between the robot 502 (e.g., the unified system base 030) and the mask 015. The gas can include, for example, air, oxygen, and the like. The gas tube 014 can include one or more tubes and each tube can have a separate function. For example, in some embodiments, the gas tube 014 can include three tubes-one for inhaled air, one for user pressure, and one for exhaled air. In some embodiments, the gas tube 014 can include one or more sensors that the system 400/500 can use to determine one or more factors regarding the gas tube 014 and/or the mask 015. Examples of the one or more factors regarding the gas tube 014 and/or the mask 015 that the system 400/500 can determine are described in detail with respect to FIG. 13. In some embodiments, for example with respect to FIG. 4, the opening that couples/connects to the ventilator 013 can include sensors and/or the opening that couples/connects to the mask 015 can also include sensors. The sensors in the two openings can be operatively and/or communicatively coupled. In some embodiments, for example with respect to FIGS. 5A and 5B, the opening that couples/connects to the robot 502 (e.g., the unified system base 030) can include sensors and/or the opening that couples/connects to the mask 015 can include sensors. The sensors in the two openings can be operatively and/or communicatively coupled.

Figure 17:
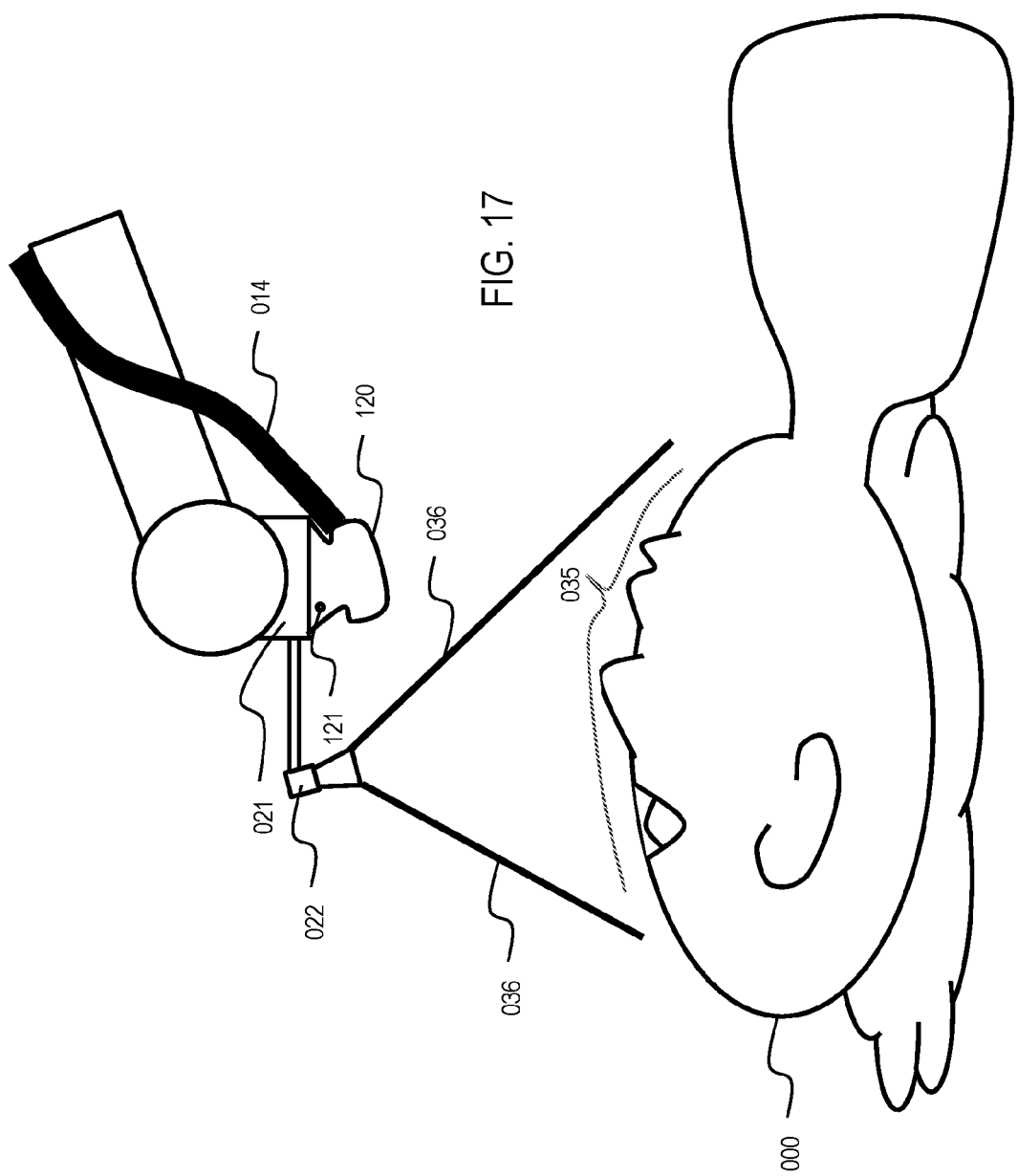
FIG. 17 illustrates a nasal mask and corresponding sensors, according to some embodiments.

The mask 015 is coupled/attached/fixed to the robot 402/502 (e.g., the robot flange 021) and coupled/attached/fixed to the gas tube 014. The mask 015 can be a nasal mask, a mouth mask, or a face mask. Referring briefly to FIG. 17, it illustrates a nasal mask 120 and corresponding chip 121 (e.g., RFID chip), according to some embodiments. Referring back to FIGS. 4 and 5A-5D, examples of face masks include oral masks and naso-oral masks. In some embodiments, the mask 015 includes force sensors, torque sensors, position sensors, contact sensors, and the like. In some embodiments, the mask 015 can be removed from the robot 402/502, for example, for cleaning, sterilizing, sanitizing, replacing, and the like.

As illustrated in FIGS. 4 and 5A-5D, the mask 015 includes an opening through which the mask 015 couples to/interfaces with the gas tube 014. In some embodiments, the opening can include one or more sensors 026 (sometimes referred to as "mask sensors 026") and the system 400/500 can use sensor data from the sensors 026 to determine one or more factors regarding the mask 015. The sensors 026 can store the sensor data in a sensor database. In some embodiments, for example with reference to FIG. 4, the sensors 026 are coupled to the ventilator 013 and/or the robot 402 (e.g., the robot base 016). In some embodiments, for example with reference to FIGS. 5A and 5B, the sensors 026 are coupled to the robot 502 (e.g., the unified system base 030). Examples of the one or more factors regarding the mask 015 that the system 400/500 can determine are described in detail with respect to FIG. 13.

As illustrated in FIGS. 4 and 5A-5D, the mask 015 includes an opening through which the mask 015 interfaces with the robot 402/502 (e.g., the robot flange 021). The opening through which the mask 015 interfaces with the robot 402/502 (e.g., the robot flange 021) includes a mounting interface. The mounting interface can be a mechanical type, a kinematic type, and the like. The mask 015 can be coupled to the robot 402/502 (e.g., the robot flange 021) via the mounting interface.

In some embodiments, the mask 015 includes a rigid housing. The rigid housing includes the opening through which the mask 015 couples to/interfaces with the gas tube 014 and/or the opening through which the mask 015 couples to/interfaces with the robot 402/502 (e.g., the robot flange 021). In some embodiments, the two aforementioned openings are a single opening. The mask 015 includes contact edges and the contact edges are covered with an inflated bladder or soft deformable material/seal which can conform to a face of the user and facilitate in forming an effective seal against the face of the user during use to ensure delivery of correctly pressurized gas from the ventilator 013 or the robot 502 (e.g., the unified system base 030).

In some embodiments, the system 400/500 can include one or more identification (ID) systems. The ID systems can be used, for example, to track uniquely identifiable parts. The ID systems can include one or more ID readers and one or more ID transponder tags. The ID readers read information from the ID transponder tags. In some embodiments, for example with reference to FIG. 4, the sensors in the opening of the gas tube 014 that connects/couples to the ventilator 013 can be ID transponder tags, and the sensors 027 in the ventilator 013 can be ID readers. In some embodiments, for example with reference to FIG. 4, the sensors in the opening of the gas tube 014 that connects/couples to the ventilator 013 can be ID transponder tags, and the robot 402 (e.g., the robot base 016) can include one or more sensors, and those sensors can be ID readers. In some embodiments, for example with reference to FIGS. 5A-5B, the sensors in the opening of the gas tube 014 that connects/couples to the robot 502 (e.g., the unified system base 030) can be ID transponder tags, and the sensors 027 in the robot 502 (e.g., the unified system base 030) can be ID readers. In some embodiments, the sensors 026 in the mask 015 can be ID transponder tags, and the sensors in the opening of the gas tube 014 that connects/couples to the mask 015 can be ID readers. In some embodiments, for example with reference to FIG. 4, the ID readers in the opening of the gas tube 014 that connects/couples to the mask 015 and the ID transponder tags in the opening of the gas tube 014 that connects/couples to the ventilator 013 can be operatively and/or communicatively coupled. In some embodiments, for example with reference to FIGS. 5A and 5B, the ID readers in the opening of the gas tube 014 that connects/couples to the mask 015 and the ID transponder tags in the opening of the gas tube 014 that connects/couples to the robot 502 (e.g., the unified system base 030) can be operatively and/or communicatively coupled. The ID systems can be based on/implement radio-frequency ID (RFID), magnetic strips, bar codes, QR codes, optical character recognition (OCR), smart card, and/or the like.

In some embodiments, the robot 402/502 (e.g., the robotic arm 017) includes load cells, force sensors (e.g., joint/force sensors), torque sensors (e.g., motor/torque sensors, force/torque sensors, etc.), position sensors (e.g., motor position sensors, joint position sensors, etc.), current sensors (e.g., motor current sensors), contact sensors (e.g., mask contact sensors), and the like. An example force/torque sensing system (e.g., force/torque sensing system 092) is described in detail with respect to FIG. 13.

In some embodiments, the robot 402 (e.g., the robot base 016)/502 (e.g., the unified system base 030) includes one or more integrated controllers/components, such as, for example a robot controller 018 (not shown in FIGS. 4, 5A-5D) and/or a system controller 019 (not shown in FIGS. 4, 5A-5D). The robot controller 018 and the system controller 019 are described in detail with respect to FIG. 13. Each controller can include one or more processors and each processor may execute instructions stored in memory. The controllers are operable to perform one or more actions. In some embodiments, the robot controller 018 and/or the system controller 019 can be remote with respect to the robot 402/502.

In some embodiments, the robot 402/502 includes a robot based biometric sensor system. An example robot based biometric sensor system (e.g., robot based biometric sensor system 088) is described in detail with respect to FIG. 13.

As illustrated in FIG. 4, the robotic arm 017 is attached to the robot base 016, and as illustrated in FIGS. 5A-5D, the robotic arm 017 is attached to the unified system base 030. The robotic arm 017 is a machine or robotic mechanism including an interconnected set of one or more links and/or one or more joints. The robotic arm 017 supports and/or moves a wrist and/or the robot flange 021 and/or the mask 015 through space, for example along one or more degrees of freedom. The wrist can include a set of joints between the robotic arm 017 and the robot flange 021 that can allow the robot flange 021 to be oriented in space. The robotic arm 017 can position and orient the robot flange 021 and/or the mask 015 with respect to the robot base 016 or the unified system base 030.

The robotic arm 017 can have one or more degrees of freedom. For example, the robotic arm 017 can have seven degrees of freedom. In some embodiments, the robotic arm 017 can have fewer degrees of freedom, for example six degrees of freedom, or more degrees of freedom, for example eight degrees of freedom.

In some embodiments, the robot flange 021 is at/coupled to a distal end of the robotic arm 017. In some embodiments, the robot 402/502 (e.g., the robot flange 021) includes an opening through which the robot 402/502 (e.g., the robot flange 021) interfaces with the mask 015. The opening through which the robot 402/502 (e.g., the robot flange 021) interfaces with the mask 015 includes one or more mounting interfaces. The mounting interfaces can be a mechanical type, a kinematic type, and the like. The robot 402/502 (e.g., the robot flange 021) can be coupled to the mask 015 via the mounting interfaces. For example, the robot flange 021 can be coupled to a proximal subassembly of the mounting interface. In some embodiments, the mounting interface is at a distal end of the robotic arm 017 or the robot flange 021. The mounting feature can allow for repeatable mechanical connection between the mask 015 and the robot 402/502 (e.g., the robot flange 021) such that when the mask 015 is removed and then reattached (or a new mask 015 is attached), the mask 015 goes back in place (with respect to the robotic arm 017 or the robot flange 021) in a repeatable, known, manner. In some embodiments, the robot flange 021 includes the sensors 026. In some embodiments, the mounting interface includes the sensors 026.

The robot 402/502 (e.g., the robot flange 021) and/or the mask 015 can be associated with one or more poses. The poses can be system determined or user determined. Examples of poses are described in detail with respect to FIG. 14. The poses can be controlled, for example, by the system controller 019 and/or the robot controller 018.

In some embodiments, the system 400/500 includes a computer vision system 022 (sometimes referred to as "machine vision system 022") including one or more imaging systems including one or more image capture devices that capture one or more images, and one or more controllers and/or processors to analyze images captured by the image capture devices and to determine one or more parameters. The image capture devices can store the captured images in an image database. The computer vision system 022 can include a single camera system, a dual camera system, a stereo camera system, and the like. Examples of parameters that the computer vision system 022 can determine are described in detail with respect to FIG. 13. In some embodiments, the computer vision system 022 includes one or more microphones and one or more speakers. In some embodiments, the computer vision system 022 can include an active illumination system/subcomponent. The active illumination system can include one or more light emitters that emit light in an area that overlaps with a field of view of computer vision system 022 (e.g., a superimposed field of view of the one or more image capture devices). The light emitters can emit light in one or more spectrums, for example in the visible spectrum, the NIR spectrum, the IR spectrum, and the like.

In some embodiments, the computer vision system 022 is a spatial sensing/tracking system. The spatial sensing/tracking systems be image-based, electromagnetic-based, acoustic-based, and/or the like.

In some embodiments, one or more components/subcomponents of the computer vision system 022 are coupled to/mounted on the robot 402/502 (e.g., the robot flange 021 and/or the robotic arm 017). In some embodiments, one or more components/subcomponents of the computer vision system 022 are a part of/integrated with the robot 402/502 (e.g., the robot flange 021 and/or the robotic arm 017). In some embodiments, one or more components/subcomponents of the computer vision system 022 can be in close proximity of a workspace of the robot 402/502. For example, one or more components/subcomponents of the computer vision system 022 can be mounted to a wall, bed frame, headboard, nightstand, and/or the like. The computer vision system 022 can be operatively coupled to the robot 402/502 (e.g., the robot flange 021) and can be connected (e.g., operatively coupled and/or communicatively coupled) to the robot 402/502 (e.g., the system controller 019) via an electrical interface 023 (sometimes referred to as "interface 023"). The interface 023 can be a wired interface or a wireless interface. Examples of imaging system red-green-blue (RGB) imaging systems, greyscale imaging systems, near-infrared (NIR) imaging systems, infrared (IR) imaging systems, light detection and ranging (LiDAR) imaging systems, and the like. Examples of image capture devices include RGB cameras, NIR cameras, IR cameras, LiDAR cameras, and the like.

Figure 7B:
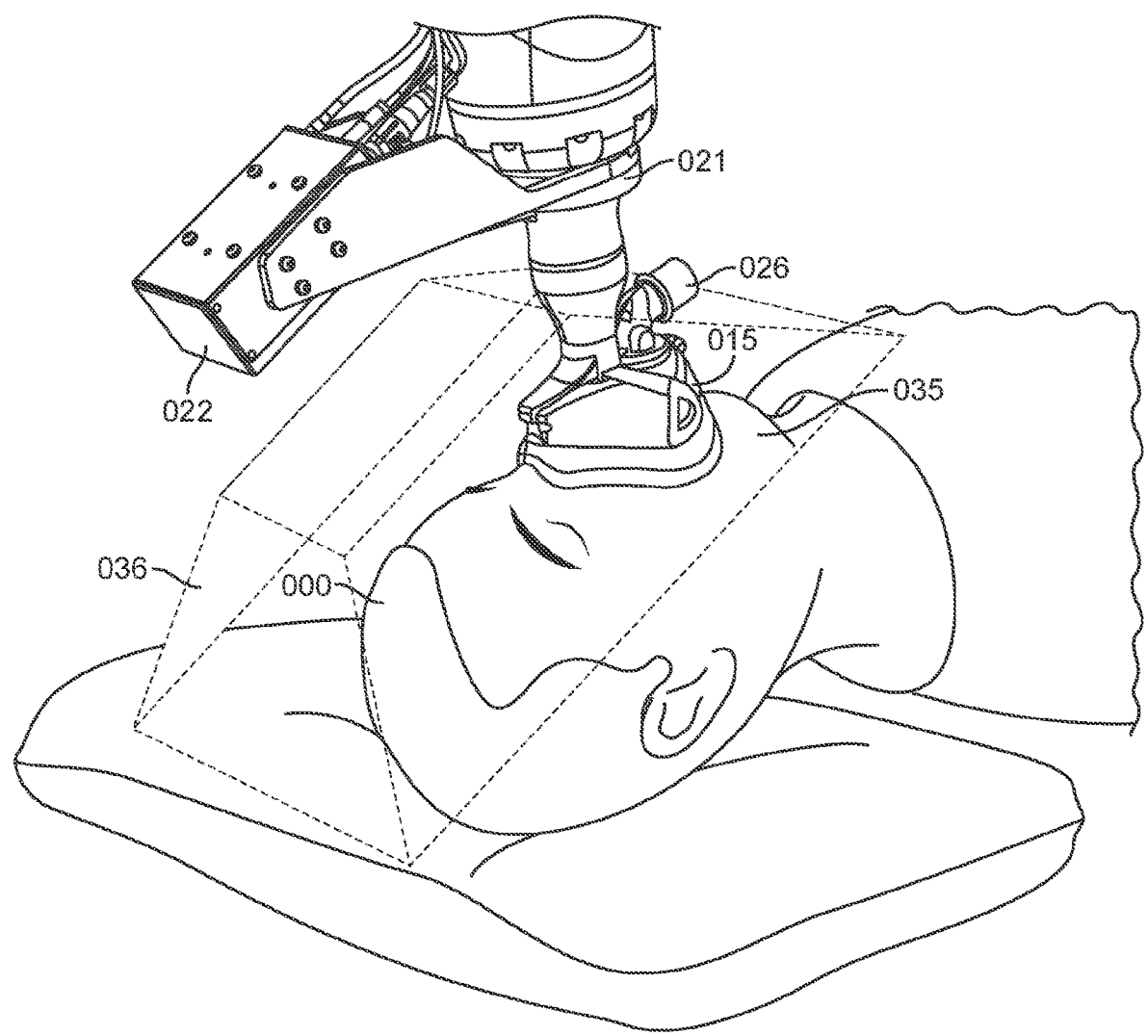
Figure 7C:
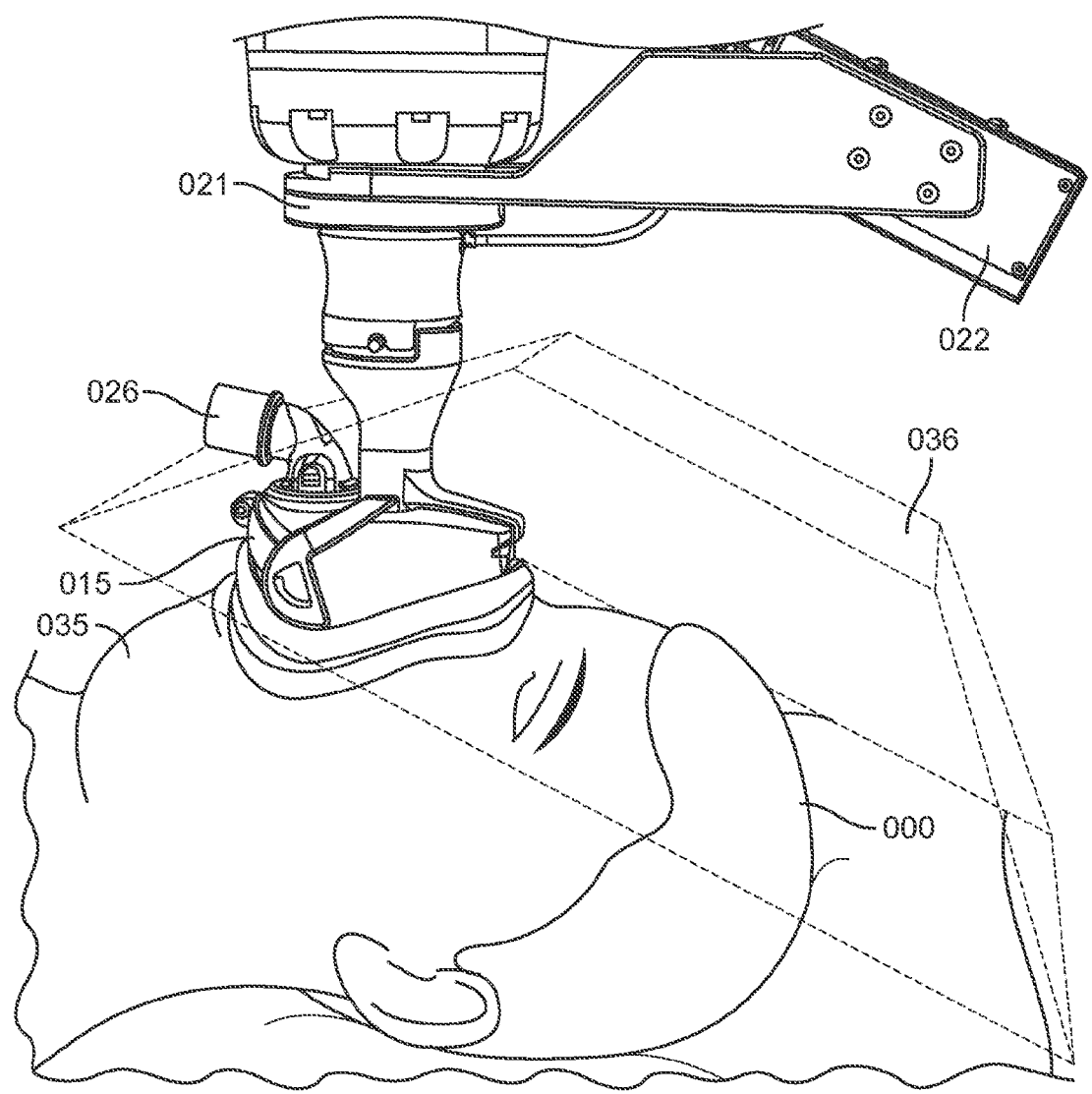

FIGS. 7A-7C illustrate fields of views 036 of the computer vision system 022, according to some embodiments. In some embodiments, for example as illustrated in FIGS. 7A-7C, a field of view 036 of the computer vision system 022 includes the mask 015. In some embodiments, for example as illustrated in FIGS. 7A-7C, the field of view 036 of the computer vision system 022 includes a face 035 of a user 000. In some embodiments, the field of view 036 of the computer vision system 022 corresponds to a superimposed field of view of the image capture devices of the computer vision system 022.

In some embodiments, the computer vision system 022 is communicatively coupled to/is a part of/and/or includes a robot based biometric system. An example robot based biometric system (e.g., robot based biometric system 088) is described in detail with respect to FIG. 13. The computer vision system 022 is communicatively coupled to the robot 402/502. In some embodiments, for example with reference to FIG. 4, the computer vision system 022 can be communicatively coupled to the robot base 016. In some embodiments, for example with reference to FIGS. 5A and 5B, the computer vision system 022 can be communicatively coupled to the unified system base 030.

FIG. 8 illustrates an image processing method 038 (sometimes referred to as "method 038"), according to some embodiments. In some embodiments, one or more steps/algorithms/sub-algorithms of the image processing method 038 can be executed by/in the computer vision system 022 and/or the robot 402/502 (e.g., the robot base 016 and/or the unified system base 030).

The method 038 starts with capturing/receiving/accessing image data 039. The image data 039 can be stored in an image database. In some embodiments, the image data 039 includes an image of the mask 015. In some embodiments, the image data 039 includes an image of the face 035 of the user 000. In some embodiments, the image data 039 includes an image of the mask 015 and the face 035 of the user 000. The method 038 proceeds with filtering the image data 039 using a spatial smoothing sub-algorithm 040 or the like. The method 038 proceeds with thresholding 041 the spatially-smoothed image data or the like. The method 038 proceeds with extracting features from the spatially-smoothed image data using a feature extraction sub-algorithm 042 or the like. The method 038 proceeds with segmenting data using a segmentation sub-algorithm 043 or the like. In some embodiments, the segmentation sub-algorithm 043 is performed on the feature extracted image data. In some embodiments, the segmentation sub-algorithm 043 is performed on the extracted features. The method 038 proceeds with classifying the segmented data using a classification sub-algorithm 044 or the like. The method 038 proceeds with detecting centroids in the classified data using a centroid detection sub-algorithm 045 or the like. The method 038 returns data 046. The returned data 046 contains labeled key points of interest. In some embodiments, the returned data 046 can be sent/transmitted to the system controller 019 via the interface 023. The returned data 046 (sometimes referred to as "labeled key points of interest 046") can be stored in a key points of interest database. The labeled key points of interest can include one or more face features and/or one or more mask features.

FIG. 9 illustrates a face image 047 including labeled key points of interest, according to some embodiments. In some embodiments, for example as illustrated in FIG. 9, the face image 047 includes only the face 035 of the user 000. In some embodiments, the face image 047 includes the face 035 of the user 000 and the mask 015. In some embodiments, for example as illustrated in FIG. 9, the labeled key points of interest include one or more face feature points or groups of points of interest including, but not limited to, eye center points 048 and 049, nose center point 050, mouth lateral points 051 and 052, and mouth center point 053. The one or more face feature points or groups of points of interest can be with respect to a face coordinate frame 054. The face coordinate frame 054 represents a face reference. In some embodiments, the labeled key points of interest can include one or more mask feature points or groups of points of interest including, but not limited to, optical fiducials.

Referring back to FIG. 4, the patient attached biometric sensor system 024 estimates a state of the user, for example, using one or more subsystems, and sends/transmits the estimated state of the user to the robot 402 (e.g., the robot base 016)/502 (e.g., the unified system base 030) via an electrical interface 025 (sometimes referred to as "interface 025"). The patient attached biometric sensor system 024 can store the estimated state of the user in an estimated state database. The interface 025 can be a wired interface or a wireless interface. The patient attached biometric sensor system 024 is described in detail with respect to FIGS. 11, 12A, 12B, and 15.

FIG. 11 illustrates a block diagram of the patient attached biometric sensor system 024, according to some embodiments. The patient attached biometric sensor system 024 includes an embedded computer system 072, a battery 079, a wireless interface 069, an antenna 070 to interface with an electrical interface 071 to receive and/or transmit data 071, and one or more subsystems including, for example, a temperature sensor subsystem 073, a blood oxygen saturation sensor subsystem 074, a pulse rate sensor system 075, an inertial sensor subsystem 076, an ambient sound sensor subsystem 077, and an ambient light sensor subsystem 078. In some embodiments, the patient attached biometric sensor system 024 can include fewer subsystems. In some embodiments, the patient attached biometric sensor system 024 can include additional subsystems.

Figure 15:
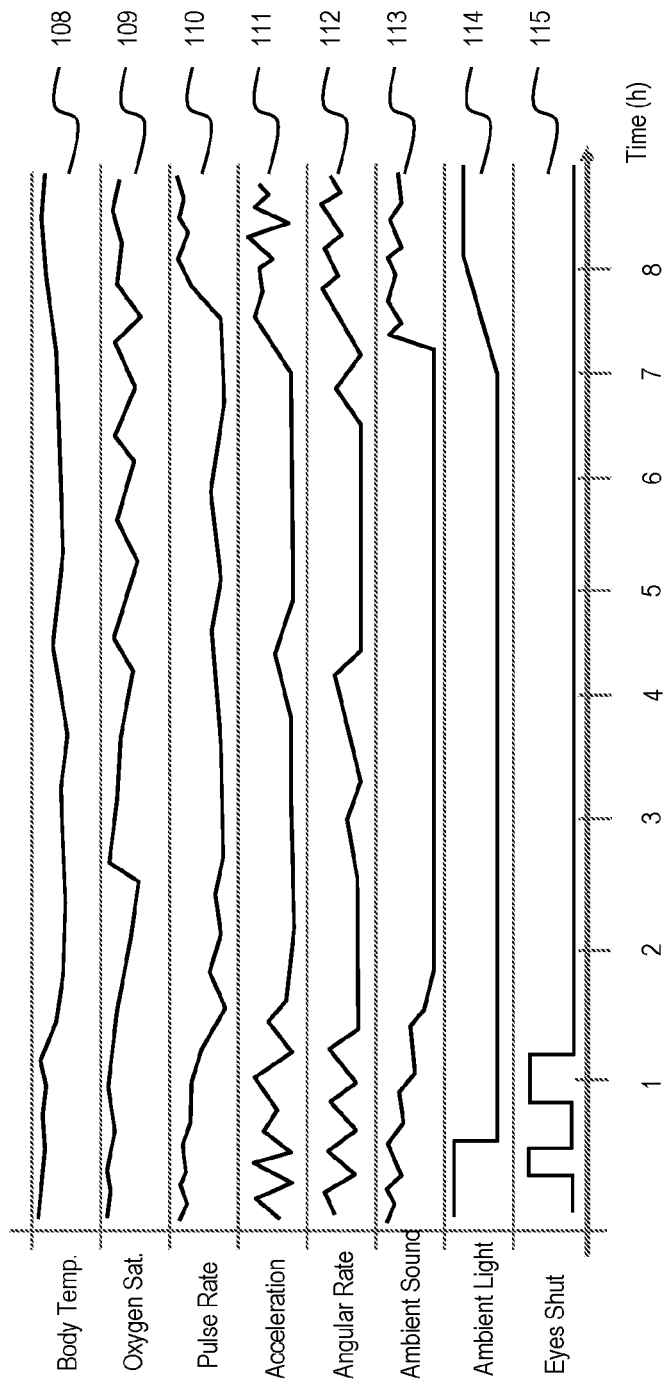
FIG. 15 illustrates a time-based plot of signals from a patient attached biometric sensor system and/or a robot based biometric sensor system, according to some embodiments.

FIG. 15 illustrates a time-based plot of signals from the patient attached biometric sensor system 024 and/or a robot based biometric sensor system (e.g., robot based biometric sensor system 088 described in detail with respect to FIG. 13), according to some embodiments. The time-based plot of signals includes body temperature 108, for example based on data from the temperature sensor subsystem 073, blood oxygen saturation 109, for example based on data from the blood oxygen saturation sensor subsystem 074, pulse rate 110, for example based on data from the pulse rate sensor subsystem 075, acceleration 111, for example based on data from the inertial sensor subsystem 076, angular rate 112, for example based on data from the inertial sensor subsystem 076, ambient sound 113, for example based on data from the ambient sound sensor subsystem 077, ambient light 114, for example based on data from the ambient light sensor subsystem 078, and eye shut 115, for example based on data from the computer vision system 022. In some embodiments, the time-based plot of signals can include fewer signals. In some embodiments, the time-based plot of signals can include additional signals.

Referring back to FIG. 11, the embedded computer system 072 receives/accesses data from the one or more subsystems, determines one or more parameters based at least in part on the received data, and estimates a state of the user based at least in part on the one or more determined parameters. In some embodiments, the data that the embedded computer system 072 receives/accesses from the one or more subsystems can be referred to as biometric data. In some embodiments, the one or more parameters that the embedded computer system 072 determines based at least in part on the received data can be referred to as biometric data. The biometric data can be stored in a biometric database. Examples of parameters that the embedded computer system 072 can determine include heart rate, respiratory rate, temperature, blood oxygen saturation, ambient light, ambient sound, eye state, and the like. Examples of states of the user are described in detail with respect to FIG. 13.

In some embodiments, the embedded computer system 072 estimates the state of the user, for example using a sleep detection method. The embedded computer system 072 can store the estimated state of the user in an estimated state database. FIG. 16 illustrates a sleep detection method 097, according to some embodiments. The sleep detection method 097 receives inputs/signals including body temperature (e.g., body temperature 108), blood oxygen saturation (e.g., blood oxygen saturation 109), pulse rate (e.g., pulse rate 110), linear acceleration (e.g., acceleration 111), angular rate (e.g., angular rate 112), ambient sound (e.g., ambient sound 113), ambient light (e.g., ambient light 114), and eye status (e.g., eye shut 115). In some embodiments, the sleep detection method 097 can receive fewer inputs/signals. In some embodiments, the sleep detection method 097 can receive additional inputs/signals.

In some embodiments, the received inputs/signals are input to a multichannel low-pass filter block 116. The multichannel low-pass filter block 116 low pass filters each of the received inputs/signals. The low-passed filtered signals input to a decimation block 117. The decimation block 117 decimates each of the low-passed filtered signals. The decimated signals are fed into a state classification block 118. The state classification block 118 analyzes and/or interprets and/or processes the decimated signals, and estimates the state of the user based at least in part on the analyzed and/or interpreted and/or processed decimated signals.

Referring back to FIG. 11, the temperature sensor subsystem 073 determines a temperature of the user. In some embodiments, the temperature sensor subsystem 073 can determine a temperature of a space the user is in. The temperature sensor subsystem 073 includes one or more temperature sensors.

The blood oxygen saturation sensor subsystem 074 determines a blood oxygen saturation of the user. The blood oxygen saturation sensor subsystem 074 includes one or more blood oxygen saturation sensors.

The pulse rate sensor subsystem 075 determines a pulse rate of the user. The pulse rate sensor subsystem 075 includes one or more pulse rate sensors. In some embodiments, the pulse rate sensor subsystem 074 can determine a respiratory rate of the user. In these embodiments, the pulse rate sensor subsystem 074 includes one or more respiratory rate sensors. In some embodiments, a different sensor subsystem (e.g., a respiratory rate sensor subsystem) can determine a respiratory rate of the user. In these embodiments, the different sensor subsystem includes one or more respiratory rate sensors.

The inertial sensor subsystem 076 determines whether the patient attached biometric sensor system 024 is moving/in motion. The inertial sensor subsystem 076 includes one or more inertial sensors, each including one or more inertial measurement units (IMUs). Each IMU can include one or more accelerometers and one or more gyroscopes.

The ambient sound sensor subsystem 077 determines ambient sounds of a space the user is in. The ambient sound sensor subsystem 077 includes one or more ambient sound sensors, each including one or more microphones.

The ambient light sensor subsystem 078 determines ambient light of a space the user is in. The ambient light sensor subsystem 078 includes one or more ambient light sensors, each including one or more light sensors.

The embedded computer system 072 sends/transmits data to the robot 402/502 (e.g., the system controller 019). The data can include, for example, the data that the embedded computer system 072 receives from the one or more subsystems, the one or more parameters that the embedded computer system 072 determines based at least in part on the received data, and/or the estimated state of the user. In some embodiments, for example as illustrated in FIG. 11, the embedded computer system 072 sends/transmits the data via the wireless interface 069 utilizing the antenna 070. The embedded computer system 072 is coupled to the wireless interface 069 via a connection 080. The connection 080 can be a wired connection or a wireless connection.

The patient attached biometric sensor system 024 can be implemented in a discrete device or a part of/integrated with another device. The patient attached biometric sensor system 024 can be implemented in or be a wrist worn device, a hand worn device, a finger worn device, a chest worn device, and the like.

FIGS. 12A and 12B illustrates the patient attached biometric sensor system 024, according to some embodiments. The patient attached biometric sensor 024 illustrated in FIGS. 12A and 12B is a wrist worn device that is secured to a wrist 081 of the user, for example, in a manner similar to a wrist watch.

Figure 6A:
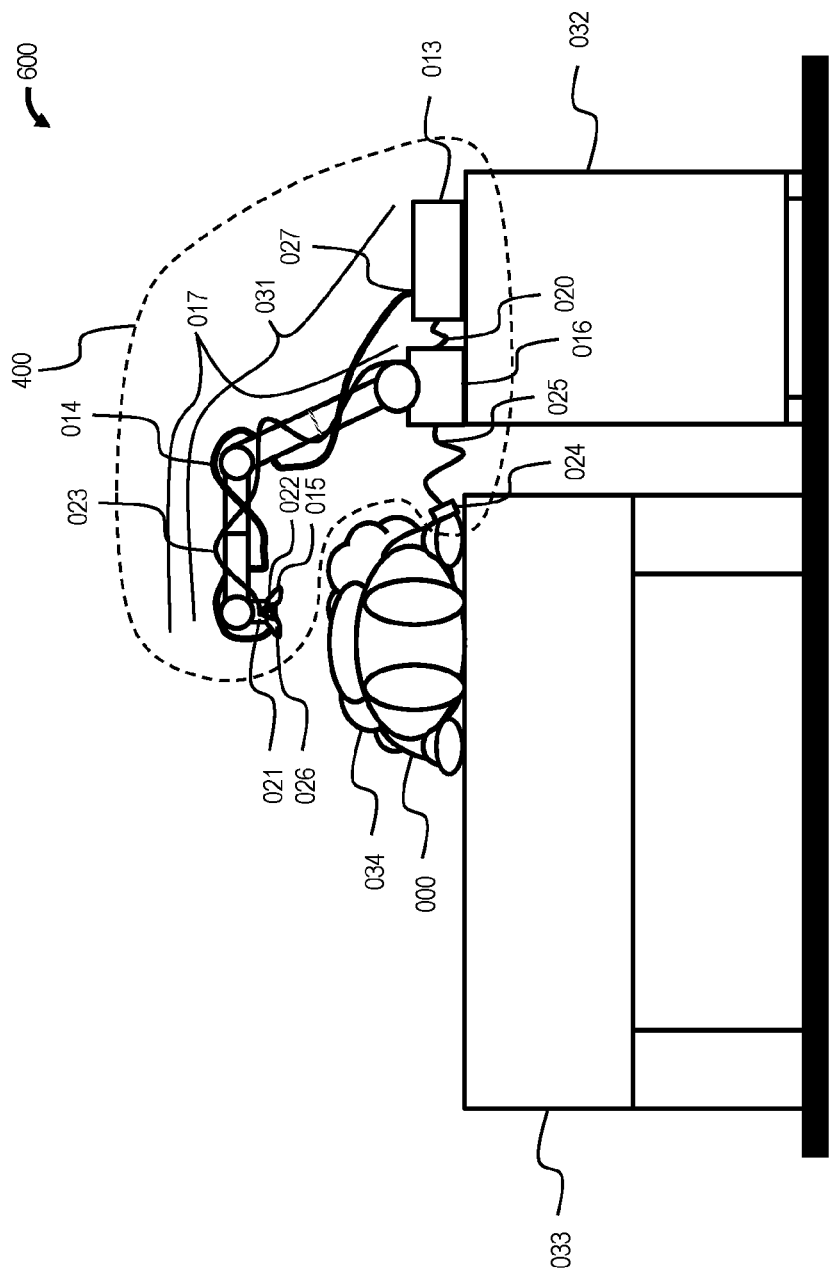
FIGS. 6A-6D illustrate a bedside system, according to some embodiments.

FIG. 6A illustrates a bedside system 600, according to some embodiments. The bedside system 600 includes the system 400 on a nightstand 032 next to a bed 033 with a pillow 034 on which a user 000 is lying. The system 400 includes a robot/robotic arm 031. The robot/robotic arm 031 can be the same as the robot 402 and/or the robotic arm 017. In some embodiments, the nightstand 032 can include the robot base 016 and/or the ventilator 013 of FIG. 4.

Figure 6B:
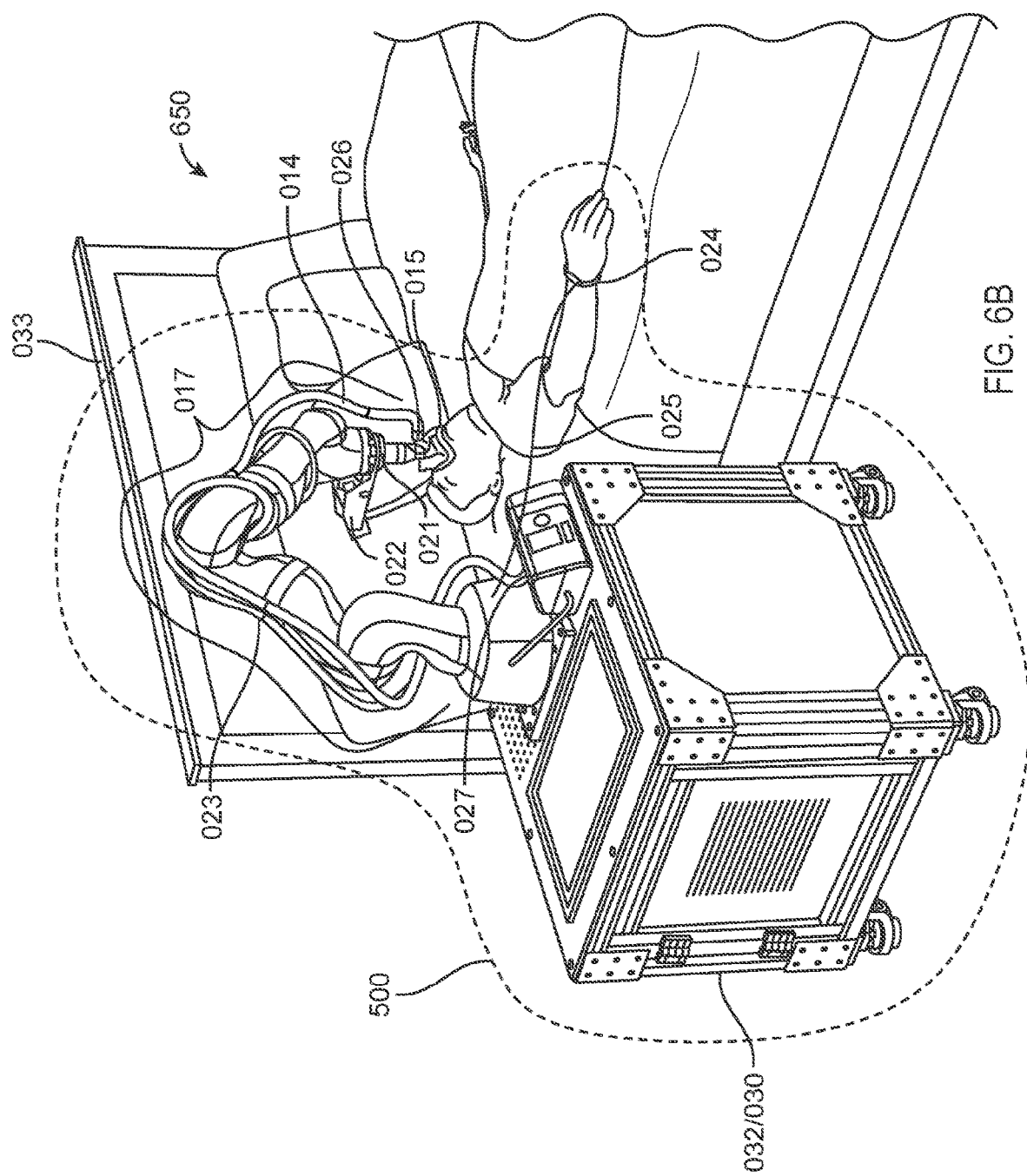
Figure 6C:
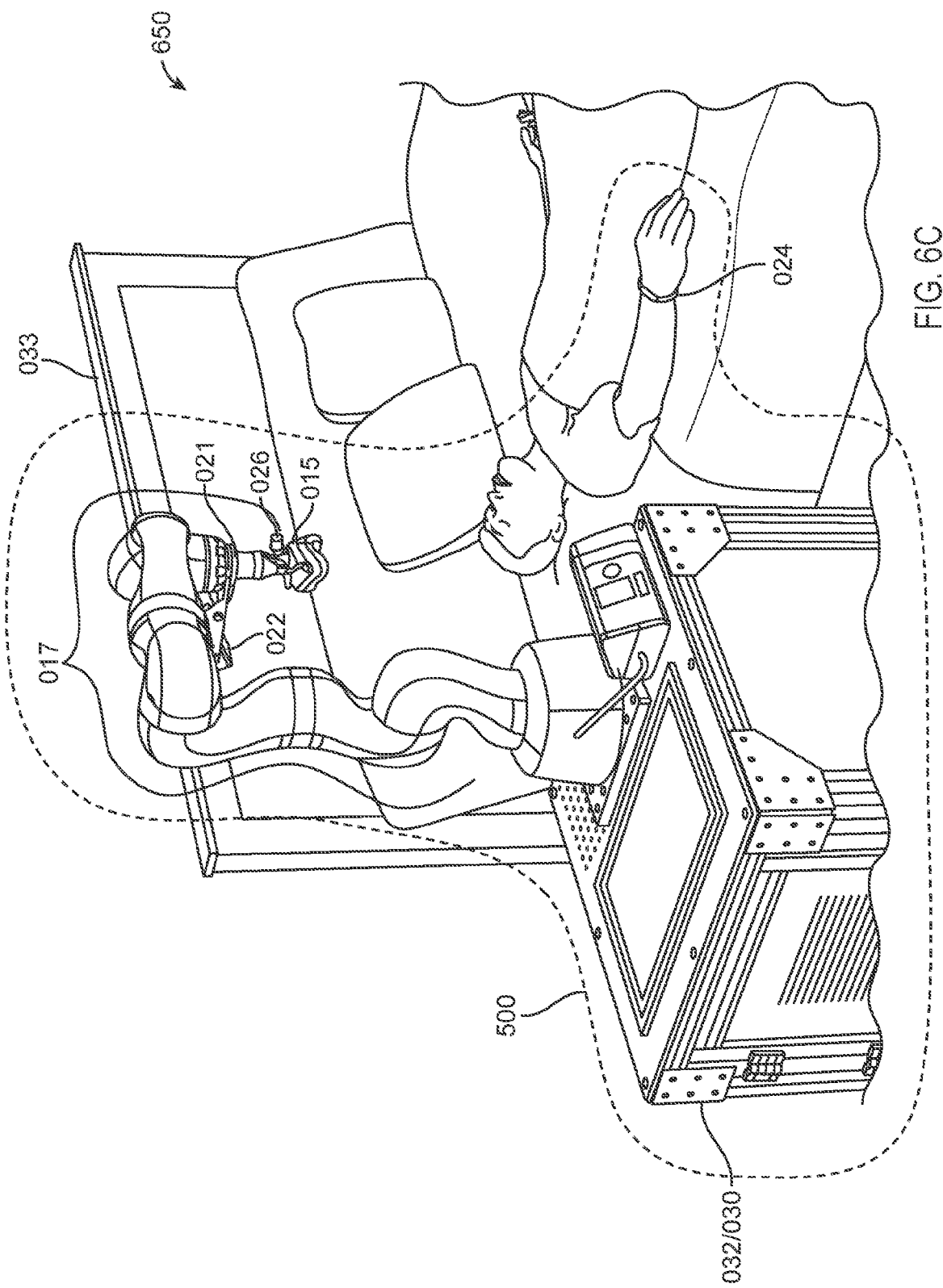
Figure 6D:
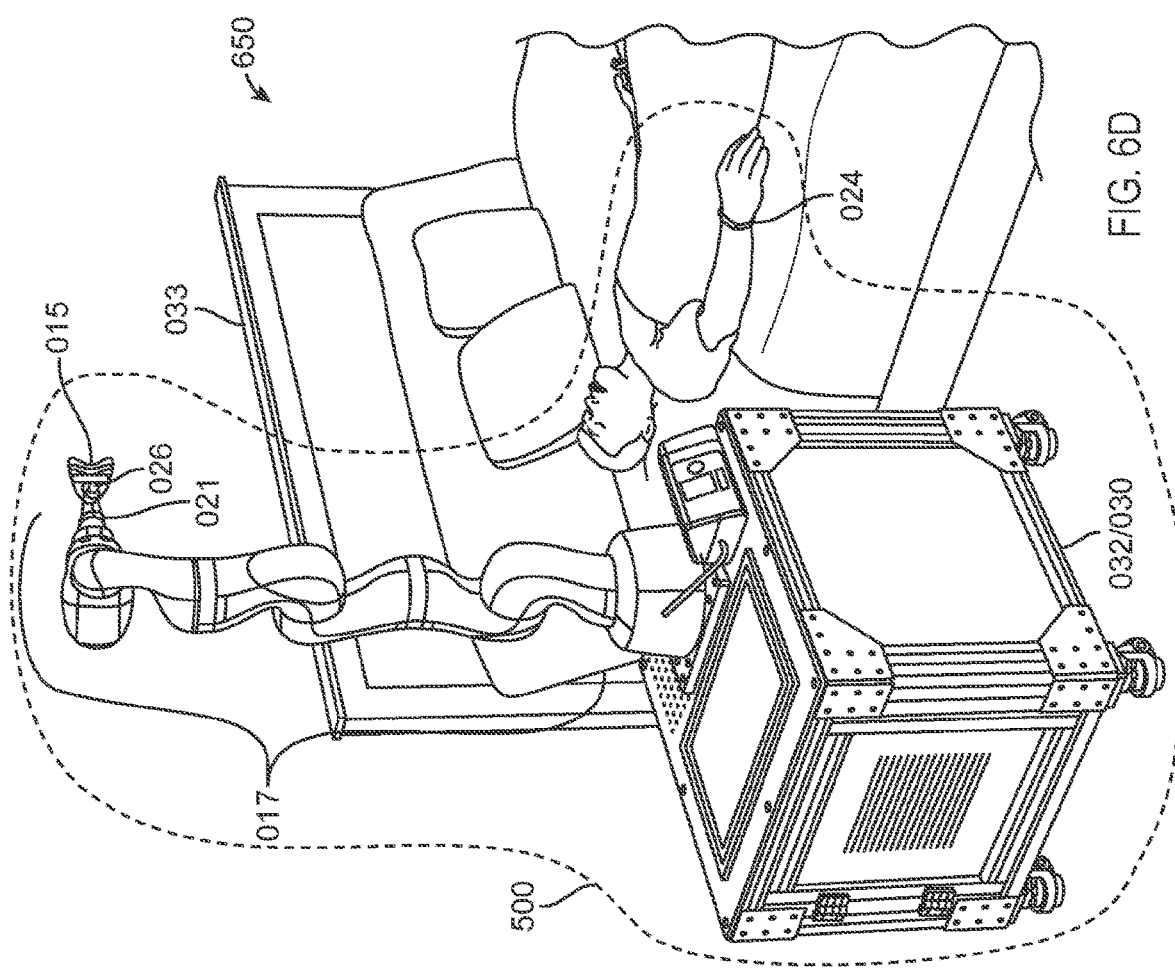

FIG. 6B-6D illustrates a bedside system 650, according to some embodiments. The bedside system 650 includes the system 500 on the nightstand 032 next to the bed 033 on which the user 000 is lying. In some embodiments, the nightstand 032 can include the unified system base 030 of FIGS. 5A-5C.

The user 000 can lay in different positions. Examples of positions include a supine position, a lateral position, a fetal position, a recovery position, and the like. FIGS. 6A-6D illustrate the user 000 in the supine position.

The system 400/500 can include one or more system coordinate frames. FIG. 10 illustrates one or more system coordinate frames, according to some embodiments. As illustrated in FIG. 10, the one or more system coordinate frames include a world coordinate frame 055, a robot base frame 056, a robot flange frame 058, a computer vision frame 060, a mask coordinate frame 062, a face coordinate frame 054, an IMU coordinate frame 065, and a ready coordinate frame 067. Each of the system coordinate frames define a reference position and orientation from which position and/or orientation can be measured/expressed.

A system coordinate frame can have a defined spatial relationship with respect to another system coordinate frame. Defined spatial relationship 057 describes a spatial relationship between the robot base frame 056 and the world coordinate frame 055. Defined spatial relationship 059 describes a spatial relationship between the robot flange frame 058 and the robot base frame 056. Defined spatial relationship 061 describes a spatial relationship between the computer vision frame 060 and the robot flange frame 058. Defined spatial relationship 063 describes a spatial relationship between the mask coordinate frame 062 and the computer vision frame 060. Defined spatial relationship 064 describes a spatial relationship between the face coordinate frame 054 and the computer vision frame 060. Defined spatial relationship 066 describes a spatial relationship between the IMU coordinate frame 065 and the robot base frame 056. Defined spatial relationship 068 describes a spatial relationship between the ready coordinate frame 067 and the mask coordinate frame 062. In some embodiments, there is a defined spatial relationship between each system coordinate frame to every other system coordinate frame. The system 400/500 can determine the defined spatial relationships.

The world coordinate frame 055 represents an environment reference. In some embodiments, the world coordinate frame 055 defines a common reference for all other system coordinate frames.

The robot base frame 056 represents a robot base reference. In some embodiments, the robot base frame 056 can be arbitrarily placed with respect to the world coordinate frame 055. In some embodiments, the robot base frame 056 can be placed with respect to the robot base 016, and points in the robot base frame 056 are relative to the robot base 016. In some embodiments, the robot base frame 056 can be placed with respect to the unified system base 030, and points in the robot base frame 056 are relative to the unified system base 030.

The robot flange frame 058 represents a robot flange reference. In some embodiments, the robot flange frame 058 can be placed with respect to the robot flange 021, and points in the robot flange frame 058 are relative to the robot flange 021.

The computer vision frame 060 represents a computer vision reference. In some embodiments, the computer vision frame 060 can be placed with respect to the computer vision system 022, and points in the computer vision frame 060 are relative to the computer vision system 022.

The mask coordinate frame 062 represents a mask reference. In some embodiments, the mask coordinate frame 062 can be placed with respect to the mask 015, and points in the mask coordinate frame 062 are relative to the mask 015.

The face coordinate frame 054 represents a face reference. In some embodiments, the face coordinate frame 062 can be placed with respect to the face of the user, and points in the face coordinate frame 054 are relative to the face of the user. In some embodiments, the face coordinate frame 054 can be a function of the pose of the face of the user. In some embodiments, the face coordinate frame 054 can be placed with respect a pose of the face of the user at a particular point in time. In some embodiments, the face coordinate frame 054 can change as the pose of the face of the user changes.

The IMU coordinate frame 065 represents an IMU reference. In some embodiments, the IMU coordinate frame 065 can be placed with respect to an IMU of the robot base 016, and points in the IMU coordinate frame 065 are relative to the robot base 016. In some embodiments, the IMU coordinate frame 065 can be placed with respect to an IMU of the unified system base 030, and points in the IMU coordinate frame 065 are relative to the unified system base 030.

The ready coordinate frame 067 represents a taught reference that can be learned and maintained. In some embodiments, the ready coordinate frame 067 can be placed with respect to the robot 402/502 (e.g., the robot flange 021) and/or the mask 015 when the face of the user is in the field of view of the computer vision system 022.

FIG. 13 illustrates a block diagram 1300 of a robotic arm system (sometimes referred to as "system 1300"), according to some embodiments. The system 1300 can be an example of the system 400/500. The system 1300 includes a system controller 019, a power supply 082, a ventilator controller 083, a wireless interface 087, a display/touchscreen 086, a robot based biometric sensors 088 (sometimes referred to as "robot based biometric sensor system 088"), a robot controller 018, a force/torque sensing system 092 (sometimes referred to as "sensing system 092"), computer vision systems 022, a patient attached biometric system 024, and an IMU 095. In some embodiments, the system 1300 can include one or more speakers and one or more microphones.

The power supply 082 supplies power to one or more components. In some embodiments, the power supply 082 includes one or more power supplies. In some embodiments, a separate power supply is associated with one or more components.

In some embodiments, the system 1300 includes no biometric sensor systems. In these embodiments, the system 1300 (e.g., the system controller 019) can be time based. For example, the system controller 019 can engage the robotic arm 017 via the robot controller 018 to place the mask 015 on the face of the user after a predetermined period of time has lapsed, for example, since the user indicated to the system controller 019 that the user is going to sleep. The system 1300 (e.g., the system controller 019) can receive user input indicating that the user is going to sleep via the display/touchscreen 086, the wireless interface 087, and/or the microphones. In some embodiments, the system 1300 (e.g., the system controller 019) can adjust/reconfigure/customize the predetermined period of time based on user input via the display/touchscreen 086, the wireless interface 087, and/or the microphones.

In some embodiments, the system 1300 includes one or more biometric sensor systems. For example, the system 1300 includes the robot based biometric sensor system 088 and/or the patient attached biometric system 024. In some embodiments, the one or more biometric sensor systems can be in a workspace of the system 1300 (e.g., the robot 402/502). For example, the one or more biometric sensor systems can be mounted to a wall, bed frame, headboard, nightstand, and/or the like.

There are two types of sleep: rapid eye movement (REM) sleep and non-REM sleep (which has three stages). The three stages of non-REM sleep include: stage 1 non-REM sleep, stage 2 non-REM sleep, and stage 3 non-REM sleep. Stage 1 non-REM sleep is the changeover from wakefulness to sleep. Stage 2 non-REM sleep is a period of light sleep before entering deeper sleep. Stage 3 non-REM sleep is a period of deep sleep. REM sleep is sleep including rapid eye movement. Examples of states of the user include a wakeful state, a stage 1 non-REM sleep state, a stage 2 non-REM sleep state, a stage 3 non-REM sleep state, a REM sleep state, and the like.

The robot based biometric sensor system 088 captures/receives/accesses data from one or more subsystems, for example from the computer vision system 022. The data can be image data, biometric data, and/or the like. In some embodiments, the robot based biometric sensor system 088 includes the computer vision system 022. In some embodiments, the computer vision system 022 includes the robot based biometric sensor system 088. The robot based biometric sensor system 088 determines one or more parameters (e.g., biometric data) based at least in part on the received data. Examples of parameters include heart rate, respiratory rate, temperature, blood oxygen saturation, ambient light, ambient sound, eye state, and the like. The robot based biometric sensor system 088 can store the one or more determined parameters (e.g., the biometric data) in a biometric database. The robot based biometric sensor system 088 estimates a state of the user based at least in part on the one or more determined parameters (e.g., the biometric data). In some embodiments, the robot based biometric sensor system 088 estimates the state of the user using a sleep detection method, for example the sleep detection method 097 of FIG. 16. The robot based biometric sensor system 088 can store the estimated state of the user in an estimated state database. As illustrated in FIG. 13, the robot based biometric sensor system 088 is communicatively coupled to the system controller 019, for example via an electrical interface 089 (sometimes referred to as "interface 089"). The interface 089 can be a wired interface or a wireless interface. The robot based biometric sensor system 088 sends/transmits the data from the one or more subsystems, the one or more determined parameters (e.g., the biometric data), and/or the estimated state of the user (e.g., including the biometric data) to the system controller 019 via the interface 089.

The patient attached biometric sensor system 024 is described in detail with respect to FIGS. 4, 11, 12A, 12B, and 15. The patient attached biometric sensor system 024 captures/receives/accesses data from one or more subsystems. The data can be biometric data and/or the like. In some embodiments, the patient attached biometric sensor system 024 determines one or more parameters (e.g., biometric data) based at least in part on the captured data. Examples of parameters include heart rate, respiratory rate, temperature, blood oxygen saturation, ambient light, ambient sound, eye state, and the like. The patient attached biometric sensor system 024 can store the one or more determined parameters (e.g., the biometric data) in a biometric database. The patient based biometric sensor system 024 estimates a state of the user based at least in part on the one or more determined parameters (e.g., the biometric data). In some embodiments, the patient based biometric sensor system 024 estimates the state of the user using a sleep detection method, for example the sleep detection method 097 of FIG. 16. The patient based biometric sensor system 024 can store the estimated state of the user in an estimated state database. As illustrated in FIG. 13, the patient attached biometric sensor system 024 is communicatively coupled to the system controller 019, for example via electrical interface 071 (sometimes referred to as "interface 071"). The interface 071 can be a wired interface or a wireless interface. The patient attached biometric sensor system 024 sends/transmits the data from the one or more subsystems, the one or more determined parameters (e.g., the biometric data), and/or the estimated state of the user (e.g., including the biometric data) to the system controller 019 via the interface 071.

The computer vision system 022 is described in detail with respect to FIGS. 4, 8, and 9. As illustrated in FIG. 13, the computer vision system 022 is communicatively coupled to the system controller 019, for example via electrical interface 094 (sometimes referred to as "interface 094") and electrical interface 039 (sometimes referred to as "interface 039"). The interfaces 094 and 039 can be wired interfaces or wireless interfaces.

The computer vision system 022 receives control data from the system controller 019. The control data that the computer vision system 022 receives from the system controller 019 can include one or more commands. Examples of commands include exposure/shutter speed values, aperture values, ISO values, gain values, sub-sampling values, operation in different filtering modes, operation in different region detection modes (e.g., 100% image sensor utilization, 70% sensor image sensor utilization, 50% image sensor utilization, etc.), operation in different frame rate modes (e.g., low frame rate mode, normal frame rate mode, high frame rate mode, etc.), operation in different color modes (e.g., black and white, RGB, NIR, IR, etc.), wavelength, intensity, and the like. The control data can enable the computer vision system 022 to operate in a manner that is desirable by the system controller 019. The computer vision system 022 can include a command interpreter that determines/interprets commands received from the system controller 019, parses the commands, and executes the commands. The computer vision system 022 captures and/or processes images. The computer vision system 022 sends/transmits image data to the system controller 019. The image data can be raw image data, spatially-smoothed image data, feature extracted image data, segmented imaged data, classified image data, centroid detected image data, image data including labeled key points of interest, and/or the like. The computer vision system 022 can store the image data in an image database.

The robot controller 018 instructs the robot 402/502 how to operate. The robot controller 018 can instruct the robot 402/502 to operate in one or more modes, such as, for example, position/pose control mode, hybrid position-force control mode, and the like. In the position control mode, the position/pose of the robot 402/502 is controlled. In the hybrid position-force control mode, the position/pose of the robot 402/502 as well as the exerted force of the robot 402/502 (e.g., contact force between the mask 015 and the face of the user) is controlled. As illustrated in FIG. 13, the robot controller 018 is communicatively coupled to the system controller 019, for example via electrical interface 090 (sometimes referred to as "interface 090") and electrical interface 091 (sometimes referred to as "interface 091"). The interfaces 090 and 091 can be wired interfaces or wireless interfaces. The robot controller 018 can include a command interpreter that determines/interprets commands received from the system controller 019, parses the commands, and executes the commands.

The robot controller 018 receives/accesses a robot desired position (sometimes referred to as "desired pose") from the system controller 019 and sends/transmits a robot actual position (sometimes referred to as "actual pose") to the system controller 019. The desired pose and the actual pose can include position information (e.g., X, Y, Z) and orientation information (e.g., roll, pitch, yaw) of the robot flange 021 and/or the mask 015, and/or sensor data about the sensing system 092. The desired pose and/or the actual pose can be stored in a pose database. For example, the robot controller 018 access desired pose values in the pose database and can save actual pose values in the pose database. In some embodiments, the desired pose and the actual pose can include one or more link values and/or one or more joint values of one or more components of the robot 402/502 (e.g., one or more components of the robotic arm 017). Examples poses are described in detail with respect to FIGS. 6A-6D.

In some embodiments, the robot controller 018 instructs the robotic arm 017 to move such that the pose of the robot flange 021 and/or the mask 015 corresponds to the desired pose. For example, the robot controller 018 can determine one or more link values and/or one or more joint values of the one or more components of the robot 402/502 (e.g., the one or more components of the robotic arm 017) that would result in the result in the pose of the robot flange 021 and/or the mask 015 to correspond to the desired pose, and change values of the one or more links to the one or more determined link values, and change values of the one or more joints to the one or more determined joint values.

The sensing system 092 determines/derives values (sometimes referred to as "sensor data") from sensors of the sensing system 092. The sensing system 092 can store the sensor data in a sensor database. For example, the sensing system 092 can determine/derive force values from force sensors, torque values from torque sensors, position values from position sensors, current values from current sensors, contact values from contact sensors, and the like. The sensing system 092 can store the determined/derived values in a sensor database. Examples of force values include joint/force values, and examples of force sensors include joint/force sensors. Examples of torque values include motor/torque values and force/torque values, and examples of torque sensors include motor/torque sensors and force/torque sensors. Examples of position values include motor position values and joint position values, and examples of position sensors include motor position sensors and joint position sensors. Examples of current values include motor current values, and examples of current sensors include motor current sensors. Examples of contact values include mask contact values, and examples of contact sensors include mask contact sensors. As illustrated in FIG. 13, the sensing system 092 is communicatively coupled to the system controller 019, for example via electrical interface 093 (sometimes referred to as "interface 093"). The interface 093 can be a wired interface or a wireless interface. The sensing system 092 sends/transmits sensor data to the system controller 019.

In some embodiments, the sensing system 092 is a discrete system/subsystem. In these embodiments, the sensing system 092 can send/transmit sensor data to the system controller 019 and/or to the robot controller 018. In some embodiments, the sensing system 092 is a part of/integrated with one or more components. In embodiments where the sensing system 092 is a part of/integrated with the robot controller 018, the robot controller 018 can determine/derive the values (sometimes referred to as "sensor data") from the sensors. In embodiments where the sensing system 092 is a part of/integrated with the system controller 019, the system controller 019 can determine/derive the values (sometimes referred to as "sensor data") from the sensors. The discrete sensing system 092 may provide better performance/sensitivity than compared to its part of/integrated counterpart.

In some embodiments, the robot controller 018 receives sensor data from the sensing system 092. In some embodiments, the robot controller 018 accesses sensor data stored in a sensor database. In these embodiments, the robot controller 018 can adjust the desired pose and/or the actual pose based at least in part on the sensor data.

The display/touchscreen 086, the wireless interface 087, and the microphones/speakers enable the user to control/interact with the system 1300. The display/touchscreen 086 can include one or more displays and one or more touchscreen interfaces. In some embodiments, the display/touchscreen 086 can include one or more buttons. In some embodiments, the user can control/interact with the system 1300 using a mobile device (e.g., smartphone, tablet, laptop, and the like) via the wireless interface 087. In some embodiments, the display/touchscreen 086 includes an emergency stop button. The emergency stop button may be a hard button and/or a soft button. In some embodiments, the user can control/interact with the system 1300 using their voice via the microphones/speakers.

The IMU 095 is a spatial position/orientation measurement device. The IMU 095 can include one or more IMUs. Each IMU can include one or more accelerometers and one or more gyroscopes. The IMU 095 can be a part of the robot 402/502. As illustrated in FIG. 13, the IMU 095 is communicatively coupled to the system controller 019, for example via electrical interface 096 (sometimes referred to as "interface 096"). The interface 096 can be a wired interface or a wireless interface. The IMU 095 sends/transmits IMU data to the system controller 019. The IMU 095 can store the IMU data in an IMU database. A spatial relationship between the IMU 095 and the robot 402/502 (e.g. the robot base 016 or the unified system base 030) can be predetermined (e.g., by design) and/or determined (e.g., through/at calibration).

The ventilator controller 083 enables customized delivery of gas from the ventilator 013 to the mask 015, for example, through monitoring of one or more parameters of the ventilator 013, the gas tube 014, and/or the mask 015. In some embodiments, the ventilator controller 083 delivers gas from the ventilator 013 to the mask 015, for example, through monitoring of one or more parameters of the ventilator 013, the gas tube 014, and/or the mask 015. Examples of one or more parameters of the ventilator 013, the gas tube 014, and/or the mask 015 include pressure, volume, air flow, air leakage, power levels, and the like, of the ventilator 013, the gas tube 014, and/or the mask 015. The ventilator controller 083 can deliver gas from the ventilator 013 to the mask 015, for example, based at least in part on one or more parameters (e.g., biometric data) from the robot based biometric sensor system 088, one or more parameters (e.g., biometric data) from the patient attached biometric sensor system 024, image data from the computer vision system 022. As illustrated in FIG. 13, the ventilator controller 083 is communicatively coupled to the system controller 019, for example via electrical interface 084 (sometimes referred to as "interface 084") and electrical interface 085 (sometimes referred to as "interface 085"). The interfaces 084 and 085 can be wired interfaces or wireless interfaces.

In some embodiments, the ventilator controller 083 is in the ventilator 013. In some embodiments, the ventilator controller 083 is in the robot 402 (e.g., the robot base 016)/502 (e.g., the unified system base 030). In some embodiments, there is no ventilator controller 083.

The ventilator controller 083 sends/transmits CPAP status signals (sometimes referred to as "status signals") to the system controller 019. The ventilator controller 083 can store the status signals in a signals database. The status signals can include information related to the one or more parameters of the ventilator 013, the gas tube 014, and/or the mask 015. The ventilator controller 083 receives CPAP control signals (sometimes referred to as "control signals") from the system controller 019. The ventilator controller 083 can access control signals stored in a signals database. The control signals can include commands/instructions which can include adjustments to be made to the one or more parameters of the ventilator 013, the gas tube 014, and/or the mask 015.

In some embodiments, the ventilator controller 083 can adjust current and/or desired values of the one or more parameters of the ventilator 013, the gas tube 014, and/or the mask 015, based at least in part on previous values of one or more parameters of the ventilator 013, the gas tube 014, and/or the mask 015.

The system controller 019 captures/receives/accesses data from one or more components, analyzes and/or interprets the captured/received/accessed data, and generates commands/instructs based at least in part on the captured/received/accessed/analyzed/interpreted data.

In some embodiments, the system controller 019 receives the estimated state of the user from the robot based biometric sensor system 088 and/or from the patient attached biometric sensor system 024. In some embodiments, the system controller 019 accesses an estimated state of the user in an estimated state database. In some embodiments, the system controller 019 receives one or more parameters (e.g., biometric data) from the robot based biometric sensor system 088 and/or one or more parameters (e.g., biometric data) from the patient attached biometric sensor system 024, and estimates the state of the user based at least in part on the one or more parameters (e.g., biometric data) received from the robot based biometric sensor system 088 and/or the one or more parameters (e.g., biometric data) from the patient attached biometric sensor system 024. In some embodiments, the system controller 019 accesses one or more parameters (e.g., biometric data) in a biometric database and estimates the state of the user based at least in part on the one or more parameters (e.g., the biometric data) in the biometric database. In some embodiments, the system controller 019 estimates the state of the user using a sleep detection method, for example the sleep detection method 097 of FIG. 16.

In some embodiments, the system controller 019 receives image data from the computer vision system 022. In some embodiments, the system controller 019 estimates the state of the user based at least in part on the received image data. In some embodiments, the system controller 019 uses the received image data to determine a spatial relationship of the facial features of the user with respect to the mask 015 and/or the robot 402/502 and/or one or more parts/systems/components thereof. In some embodiments, the system controller 019 accesses image data in an image database. In some embodiments, the system controller 019 estimates the state of the user based at least in part on the accessed image data. In some embodiments, the system controller 019 uses the accessed image data to determine a spatial relationship of the facial features of the user with respect to the mask 015 and/or the robot 402/502 and/or one or more parts/systems/components thereof.

The system controller 019 determines the desired pose of the robot 402/502 (e.g., the robot flange 021) and/or the mask 015. In some embodiments, the system controller 019 stores the desired pose in a pose database. In some embodiments, the system controller 019 receives the actual pose of the robot 402/502 (e.g., the robot flange 021) and/or the mask 015 from the robot controller 018. In some embodiments, the system controller 019 accesses the desired pose in a pose database. In some embodiments, the system controller 019 can determine the desired pose based at least in part on the actual pose. In some embodiments, the system controller 019 can determine the desired pose based at least in part on the image data received from the computer vision system 022. For example, the system controller 019 can determine the desired pose based at least in part on labeled key points of interest that include, for example, one or more fiducial feature points or groups of points, one or more face feature points or groups of points and/or one or more mask feature points or groups of points.

In some embodiments, the system controller 019 receives sensor data from the sensing system 092, sensor data from the sensors 026, and/or sensor data from the sensors 027. In some embodiments, the system controller 019 accesses sensor data in a sensor database. In some embodiments, the system controller 019 determines the desired pose based at least in part on the sensor data.

In some embodiments, the system controller 019 receives the status signals from the ventilator controller 083. In some embodiments, the system controller 019 accesses status signals in a signals database. In some embodiments, the system controller 019 generates control signals based at least in part on the received status signals. In some embodiments, the system controller 019 sends/transmits the generated control signals to the ventilator controller 083. In some embodiments, the system controller 019 stores the generated control signals in a signals database.

In some embodiments, the system controller 019 receives IMU data from the IMU 095. In some embodiments, the system controller 019 accesses IMU data in an IMU database. The system controller 019 can use the IMU data to determine whether the robot 402/502 is level and/or stable. In some embodiments, if the system controller 019 determines the robot 402/502 is not level and/or stable, the system controller 019 can inform the user using the display/touchscreen 086, via the wireless interface 087, and/or using the speakers that the robot 402/502 is not level and/or stable, and/or can instruct the robot controller 018 to transition the robot 402/502 (e.g., the robot flange 021) and/or the mask 015 to an idle pose or a ready pose.

The system controller 019 can use the IMU data to implement gravity compensation, for example, by determining gravity direction and magnitude with respect to the robot 402/502, and by applying appropriate values to the robot 402/502 based at least in part on the determined gravity direction and magnitude.

In some embodiments, the system controller 019 can receive sensor data from the sensors 026. In some embodiments, the system controller 019 can access sensor data in a sensor database. The system controller 019 can use the sensor data to determine one or more factors regarding the mask 015, such as, for example, a make and model of the mask 015, whether the mask 015 is securely fashioned to the gas tube 014, usage of the mask 015, whether the mask 015 should be cleaned, sterilized, sanitized, replaced, and the like. The system controller 019 can display information related to the one or more factors, for example using the display/touchscreen 086 and/or via the wireless interface 087.

In some embodiments, the system controller 019 can receive sensor data from the sensors 027. In some embodiments, the system controller 019 can access sensor data in a sensor database. The system controller 019 can use the sensor data to determine one or more factors regarding the gas tube 014, such as, for example, a make and model of the gas tube 014, whether the gas tube 014 is securely fashioned to the ventilator 013 and/or the unified system base 030, usage of the gas tube 014, whether the gas tube 014 should be cleaned, sterilized, sanitized, replaced, and the like. The system controller 019 can display information related to the one or more factors, for example using the display/touchscreen 086 and/or via the wireless interface 087.

The system controller 019 can read data on the chip 121 and can determine one or more factors regarding the nasal mask 120, such as, for example, a make and model of the nasal mask 120, whether the nasal mask 015 is securely fashioned to the gas tube 014, usage of the nasal mask 015, whether the nasal mask 015 should be cleaned, sterilized, sanitized, replaced, and the like. The system controller 019 can display information related to the one or more factors, for example using the display/touchscreen 086 and/or via the wireless interface 087.

In some embodiments, the system controller 019, the ventilator unit 083, and/or the robot controller 018 can estimate the state of the user based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like.

In some embodiments, the system controller 019, the ventilator unit 083, and/or the robot controller 018 can instruct the robot 402/502 how to operate based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. For example, the system controller 019, the ventilator unit 083, and/or the robot controller 018 can determine the desired pose of the robot 402/502 (e.g., the robot flange 021) and/or the mask 015, adjust the desired pose and/or the actual pose of the robot 402/502 (e.g., the robot flange 021) and/or the mask 015, and/or instruct the robotic arm 017 to move such that the pose of the robot 402/502 (e.g., the robot flange 021) and/or the mask 015 corresponds to the desired pose, based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like.

In some embodiments, the system controller 019, the robot controller 018, and/or the sensing system 092 can measure/determine spatial relationships between one or more components based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. The system controller 019 and/or the robot controller 018 can store the measured/determined spatial relationships in internal non-volatile memory.

In some embodiments, the system controller 019, the robot controller 018, and/or the sensing system 092 can detect/determine one or more contact events based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. An example contact event includes the mask 015 making contact with the face of the user.

In some embodiments, the system controller 019, the robot controller 018, and/or the ventilator controller 083 can adjust current and/or desired values of the one or more parameters of the ventilator 013, the gas tube 014, and/or the mask 015, based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026, 027, and/or 121, and/or the like.

Figure 14:
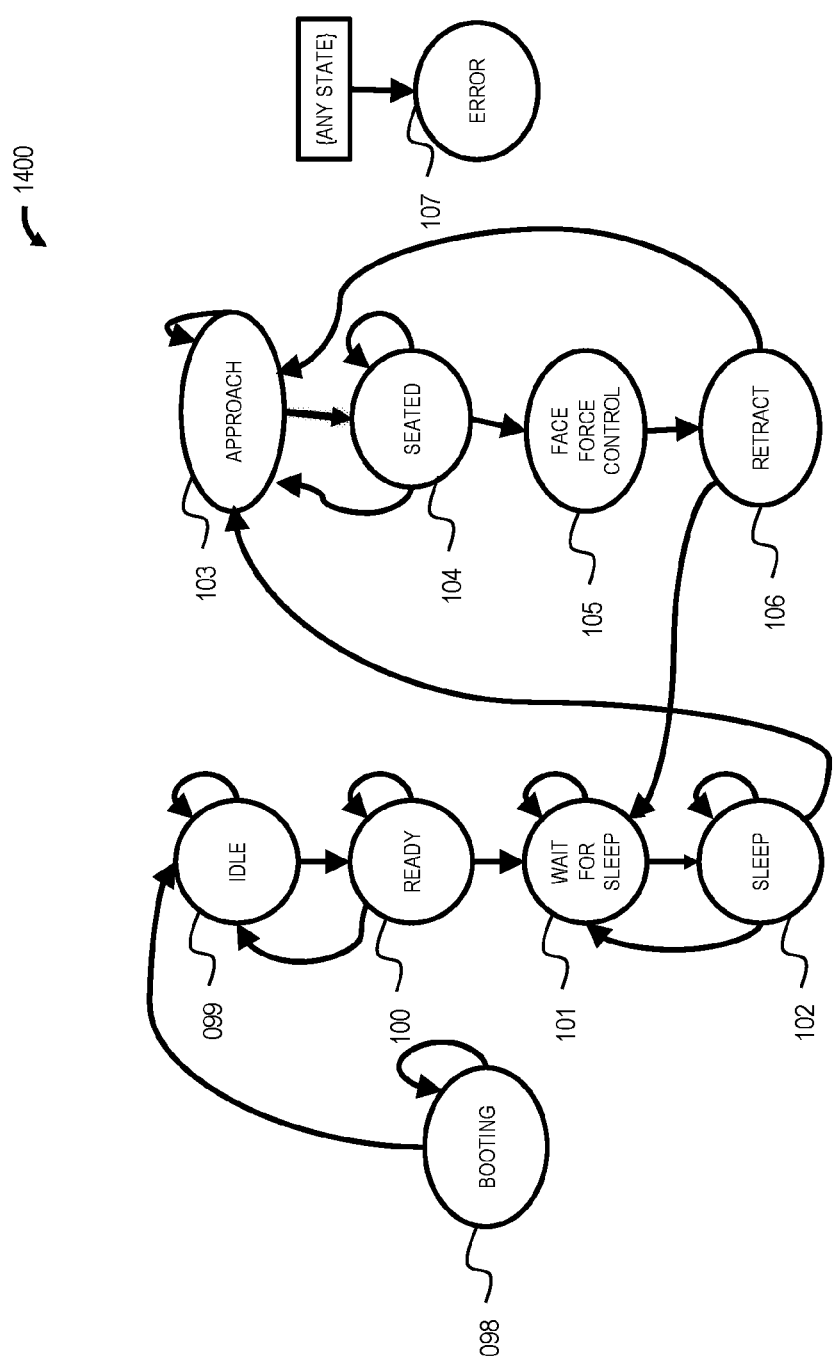
FIG. 14 illustrates a state machine, according to some embodiments.

FIG. 14 illustrates a state machine 1400, according to some embodiments. The state machine 1400 includes one or more states that a system (e.g., the system 400 of FIG. 4/the system 500 of FIGS. 5A-5D/the system 1300 of FIG. 13) can assume. As illustrated in FIG. 14, the state machine 1400 includes a booting state 098, an idle state 099, a ready state 100, a wait for sleep state 101, a sleep state 102, an approach state 103, a seated state 104, a face force control state 105, a retract state 106, and an error state 107. In some embodiments, the state machine 1400 can include fewer states. In some embodiments, the state machine 1400 can include additional states. For example, the state machine 1400 can include a calibration/service state, a learning state, an accessories state, and the like. Each state of the one or more states can include sub-states.

The robot 402/502 (e.g., the robot flange 021) and/or the mask 015 can be associated with one or more poses. The one or more poses can be system determined or user determined. The one or more poses can be system determined, for example, based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. The one or more poses can be user determined, for example, based on user input via the display/touchscreen 086, via the wireless interface 087, and/or by maneuvering the robot 402/502 (e.g., the robot flange 021) and/or the mask 015 to a particular position and orientation. Examples of poses include an idle pose, a ready pose, a seated pose, an accessory pose, and the like.

FIG. 6B illustrates the bedside system 650 with the robot 402/502 (e.g., the robot flange 021) and/or the mask 015 in a seated pose. In some embodiments, the seated pose is a pose of the robot 402/502 (e.g., the robot flange 021) and/or the mask 015 on the face of the user that results in a constant compression force needed to react pressurized air forces from the face of the user and to slightly compress inflated bladder or soft deformable material/seal of the mask 015. In some embodiments, the seated pose can be system determined. For example, the system controller 019, the ventilator controller 083, and/or the robot controller 018 can determine the seated pose based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. In some embodiments, the seated pose can be user determined. For example, the user can provide input to the system 400/500/1300, for example using the display/touchscreen 086, via the wireless interface 087, and/or by maneuvering the robot 402/502 (e.g., the robot flange 021) and/or the mask 015 to a position and orientation on the face of the user such that the mask 015 is in a pose on the face of the user, for example, that the user is comfortable with. The seated pose can be a function of facial features detected by the computer vision system 022. For example, the specific pose information associated with the seated pose can be relative to facial features detected by the computer vision system 022.

FIGS. 6A and 6C illustrate the bedside system 600/650 with the robot 402/502 (e.g., the robot flange 021) and/or the mask 015 in a ready pose. In some embodiments, the ready pose is a pose of the robot 402/502 (e.g., the robot flange 021) and/or the mask 015 that is in close proximity (e.g., within 12 to 18 inches) of the face of the user. In some embodiments, the ready pose can be system determined. For example, the system controller 019, the ventilator controller 083, and/or the robot controller 018 can determine the ready pose based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. In some embodiments, the ready pose can be user determined. For example, the user can provide input to the system 400/500/1300, for example using the display/touchscreen 086, via the wireless interface 087, and/or by maneuvering the robot 402/502 (e.g., the robot flange 021) and/or the mask 015 to a position and orientation in close proximity (e.g., within 12 to 18 inches) of the face of the user, for example, that the user is comfortable with.

FIG. 6D illustrates the bedside system 650 with the robot 402/502 (e.g., the robot flange 021) and/or the mask 015 in an idle pose. In some embodiments, the idle pose is a pose of the robot 402/502 (e.g., the robot flange 021) and/or the mask 015 that is not on the face of the user nor in close proximity to the face of the user. In some embodiments, the idle pose can be system determined. For example, the system controller 019, the ventilator controller 083, and/or the robot controller 018 can determine the idle pose based at least in part on one or more parameters (e.g., biometric data) from the robot based biometric sensor system 088, one or more parameters (e.g., biometric data) from the patient attached biometric sensor system 024, image data from the computer vision system 022, the actual pose of the robot 402/502 (e.g., the robot flange 021) and/or the mask 015, sensor data from the sensing system 092, status signals from the ventilator controller 083, IMU data from the IMU 095, sensor data from the sensors 026 and/or 027, data from the chip 121, and/or the like. In some embodiments, the idle pose can be user determined. For example, the user 000 can provide input to the system 400/500/1300, for example using the display/touchscreen 086, via the wireless interface 087, and/or by maneuvering the robot 402/502 (e.g., the robot flange 021) and/or the mask 015 to a position and orientation that is away from the face of the user, for example, that the user is comfortable with.

In the booting state 098, the system 400/500/1300 boots/initializes one or more components/subsystems thereof. For example, the system 400/500/1300 can boot/initialize the ventilator 013, the robot 402/502, the computer vision system 022, the patient attached biometric sensor system 024, and/or components/subcomponents thereof by transitioning the components and/or subcomponents thereof from an off/sleep/deep sleep state to an on/idle state. The system 400/500 transitions from the botting state 098 to the idle state 099.

In the idle state 099, the system 400/500/1300 idles one or more components/subcomponents thereof. For example, the system 400/500/1300 can idle the ventilator 013, the robot 402/502, the computer vision system 022, and/or the patient attached biometric sensor system 024. In some embodiments, the system controller 019, the ventilator controller 083, and/or the robot controller 018 set the pose of the robot 402/502 (e.g., the robot flange 021) and/or the mask 015 to the idle pose. The system 400/500/1300 transitions from the idle state 099 to the ready state 100. In some embodiments, the user initiates the transition using the display/touchscreen 086, via the wireless interface 087, and/or via the microphones.

In some embodiments, the system 400/500/1300 can transition from the idle state 099 to the calibration/service state (not illustrated). In some embodiments, the system 400/500/1300 transitions from the idle state 099 to the calibration/service state based at least in part on input from the user, for example using the display/touchscreen 086, via the wireless interface 087, and/or via the microphones. In the calibration/service state, the system 400/500/1300 can receive input from a user and/or another system/subsystem/component/subcomponent and update one or more parameters/settings/values based at least in part on the received input. For example, in the calibration/service state, the system controller 019, the robot controller 018, and/or the computer vision system 022 can measure spatial relationships between one or more components and store the measured spatial relationships in internal non-volatile memory, for example, of the system controller 019 and/or the robot controller 018.

In some embodiments, the system 400/500/1300 can transition from the idle state 099 to the learning state (not illustrated). In some embodiments, the system 400/500/1300 transitions from the idle state 099 to the learning state based at least in part on input from the user, for example using the display/touchscreen 086, via the wireless interface 087, and/or via the microphones. In the learning state, the system 400/500/1300 can receive input from a user and/or another system/subsystem/component/subcomponent and store current parameters/settings/values for recall based at least in part on the received input. For example, in the learning state, the system controller 019 and/or the robot controller 018 can learn a user desired idle pose, a user desired ready pose, a user desired seated pose, a user desired accessory pose, and the like. In some embodiments, the system 400/500/1300 initiates the learning process and a user provides user input, for example using the display/touchscreen 086, via the wireless interface 087, and/or by maneuvering the robot 402/502 to a position and orientation that the user would like to have associated with a given state. The system 400/500/1300 associates a position and orientation with a given state and stores the information in a pose database.

In some embodiments, the system 400/500 can transition from the idle state 099 to the accessory state (not illustrated). In some embodiments, the system 400/500/1300 transitions from the idle state 099 to the accessory state based at least in part on input from the user, for example using the display/touchscreen 086, via the wireless interface 087, via the and/or via one or more microphones. In the accessory state, the system 400/500/1300 can receive input from a user and/or another system/subsystem/component/subcomponent and recall parameters/settings/values based at least in part on the received input. In some embodiments, the system controller 019, the ventilator controller 083 and/or the robot controller 018 set the pose of the robot 402/502 (e.g., the robot flange 021) and/or the mask 015 to the accessory pose.

In the ready state 100, the system 400/500/1300 estimates the state of the user and waits for the user to transition from one state to another state. For example, the system 400/500/1300 waits for the user to transition from a wakefulness state to a stage 1 non-REM sleep state, a stage 2 non-REM sleep state, a stage 3 non-REM sleep state, or a REM sleep state. In some embodiments, the system 400/500/1300 sets the pose of the robot 402/502 (e.g., the robot flange 021) and/or the mask 015 to the ready pose. The system 400/500/1300 transitions from the ready state 100 to the wait for sleep state 101. In some embodiments, the user initiates the transition using the display/touchscreen 086, via the wireless interface 087, and/or the microphones.

In the wait for sleep state 101, the system 400/500/1300 estimates the state of the user and waits for the user to transition from one state to another state. For example, the system 400/500/1300 waits for the user to transition from a stage 1 non-REM sleep state to a stage 2 non-REM sleep state, a stage 3 non-REM sleep state, or a REM sleep state, or from a stage 2 non-REM sleep state to a stage 3 non-REM sleep state, or a REM sleep state, or from a stage 3 non-REM sleep state to a REM sleep state. In some embodiments, the system 400/500/1300 sets the pose of the robot 402/502 (e.g., the robot flange 021) and/or the mask 015 to the ready pose. In the embodiments where the system 400/500/1300 includes no biometric sensors, the system 400/500/1300 waits until predetermined period of time has lapsed, for example, since the system 400/500/1300 transitioned from the idle state 099 to the ready state 100. In the embodiments where the system 400/500/1300 includes one or more biometric sensors (e.g., robot based biometric sensor system 088 and/or patient attached biometric sensor system 024), the robot based biometric sensor system 088, the patient attached biometric sensor system 024, the system controller 019, the ventilator controller 083, and/or the robot controller 018 estimate the state of the user. The system 400/500/1300 transitions from the wait for sleep state 101 to the sleep state 102. In some embodiments, the system 400/500/1300 can abort the transition from the wait for sleep state 101 to the sleep state 102 based at least in part on input from the user, for example using the display/touchscreen 086, via the wireless interface 087, and/or via the microphones.

In the sleep state 102, the system 400/500/1300 determines whether the estimated sleep state of the user is a requisite sleep state (e.g., a stage 2 non-REM sleep state, a stage 3 non-REM sleep state, or a REM sleep state) and whether the estimated sleep state of the user is stable. In some embodiments, the system 400/500/1300 transitions from the sleep state 102 to the approach state 103 if the system 400/500/1300 determines the estimated sleep state of the user is the requisite sleep state and the estimated sleep state of the user is stable. In some embodiments, the system 400/500/1300 transitions from the sleep state 102 to the wait for sleep state 101 if the system 400/500/1300 determines the estimated sleep state of the user is not the requisite sleep state, and/or if the estimated sleep state of the user is not stable.

In the approach state 103, the system 400/500/1300 transitions the pose of the robot 402/502 (e.g., the robot flange 021) and/or the mask 015 from the ready pose to the seated pose. For example, the system controller 019, the ventilator controller 083, and/or the robot controller 018 transitions the pose of the robot 402/502 (e.g., the robot flange 021) and/or the mask 015. In some embodiments, transitioning the pose of the robot 402/502 (e.g., the robot flange 021) and/or the mask 015 can include moving the robot 402/502 (e.g., the robot flange 021) and/or the mask 015 until the mask 015 makes contact with the face of the user. In some embodiments, transitioning the pose of the robot 402/502 (e.g., the robot flange 021) and/or the mask 015 can include moving the robot 402/502 (e.g., the robot flange 021) and/or the mask 015 until there is an appropriate force. The force can be determined based at least in part on the sensor data from the sensing system 092. The system controller 019, the robot controller 018, and/or the sensing system 092, can detect/determine the contact event (the mask 015 making contact with the face of the user). The system controller 019, the robot controller 018, and/or the sensing system 092 can detect/determine the contact event, for example based at least in part on the sensor data from the sensing system 092. The system 400/500/1300 transitions from the approach state 103 to the seated state 104.

In the seated state 104, the system 400/500/1300 sets the pose of the robot 402/502 (e.g., the robot flange 021) and/or the mask 015 to the seated pose and supplies gas to the user. The system controller 019 and/or the ventilator controller 083 instruct the ventilator 013 or the unified system base 030 to supply gas to the user via the gas tube 014 and the mask 015. In some embodiments, the system 400/500/1300 transitions from the seated state 104 to the face force control state 105, for example, if the system 400/500/1300 is able to set the pose of the robot 402/502 (e.g., the robot flange 021) and/or the mask 015 to the seated pose successfully. In some embodiments, the system 400/500/1300 transitions from the seated state 104 to the approach state 103, for example, if the system 400/500/1300 is not able to set the pose of the robot 402/502 (e.g., the robot flange 021) and/or the mask 015 to the seated pose successfully.

In the face force control state 105, the system 400/500/1300 operates the robot 402/502 (e.g., the robot flange 021) and/or the mask 015 such that the robot 402/502 (e.g., the robot flange 021) and/or the mask 015 maintains the seated pose and an appropriate contact force, and supplies gas to the user. For example, the robot controller 018 and/or the system controller 019 command the robot 402/502 (e.g., the robotic arm 017 and/or the robot flange 021) such that the robot 402/502 (e.g., the robotic arm 017, the robot flange 021) and/or the mask 015 maintains an appropriate contact force and position/pose with respect to the face of the user. The robot controller 018 and/or the system controller 019 can continuously maintain the appropriate contact force and positions/pose even while the user moves. The movement of the robot 402/502 (e.g., the robotic arm 017 and/or the robot flange 021) can be designed to permit a safe and effective contact engagement (e.g., seal) between the mask 015 and the face of the user. The robot controller 018 and/or the system controller 019 can determine, monitor, and/or maintain the contact force based at least in part on the sensor data from the sensing system 092. The system controller 019 and/or the ventilator controller 083 instruct the ventilator 013 or the unified system base 030 to supply gas to the user via the gas tube 014 and the mask 015. The system 400/500/1300 transitions from the face force control state 105 to the retract state 106 if the robot 402/502 (e.g., the robotic arm 017 and/or the robot flange 021) and/or the mask 015 is unable to maintain the appropriate contact force and position/pose with respect to the face of the user. In some embodiments, the robot 402/502 (e.g., the robotic arm 017 and/or the robot flange 021) and/or the mask 015 may not be able to maintain the appropriate contact force and positions/pose, for example if the user awakens or moves. If the robot 402/502 (e.g., the robotic arm 017 and/or the robot flange 021) and/or the mask 015 is not able to maintain the appropriate contact force and position/pose, the system 400/500/1300 can alert the user, for example, using the display/touchscreen 086, via the wireless interface 087, and/or using the speakers.

In the retract state 106, the system 400/500/1300 transitions the pose of the robot 402/502 (e.g., the robot flange 021) and/or the mask 015 from the seated pose to the ready pose. In some embodiments, the system 400/500/1300 transitions from the retract state 106 to the wait for sleep state 101, for example if the patient based biometric sensors 024, the robot based biometric sensors 088, the system controller 019, the ventilator controller 083, and/or the robot controller 018 estimate the state of the user is a stage 1 non-REM sleep state, a stage 2 non-REM sleep state, or a stage 3 non-REM sleep state. In some embodiments, the system 400/500/1300 transitions from the retract state 106 to the approach state 103 if the patient based biometric sensors 024, the robot based biometric sensors 088, the system controller 019, the ventilator controller 083, and/or the robot controller 018 estimates the state of the user is a stage 2 non-REM sleep state, a stage 3 non-REM sleep state, or a REM sleep state.

In the error state 107, the system 400/500/1300 transitions the pose of the robot 402/502 (e.g., the robot flange 021) and/or the mask 015 to the idle pose or the ready pose. In some embodiments, the system 400/500/1300 can alert the user, for example, using the display/touchscreen 086, via the wireless interface 087, via the speakers.

In some embodiments, at any time while in any state except the error state 107, the system 400/500/1300 can transition from any state to the idle state 099 or the ready state 100 based at least in part on input from the user, for example using the display/touchscreen 086, via the wireless interface 087, and/or via the microphones. In some embodiments, the system 400/500/1300 can alert the user, for example, using the display/touchscreen 086, via the wireless interface 087, and/or via the speakers.

Additional Considerations

The foregoing description of the embodiments of the disclosure has been presented for the purpose of illustration; it is not intended to be exhaustive or to limit the disclosure to the precise form disclosed. Persons skilled in the relevant art can appreciate that many modifications and variations are possible in light of the above disclosure.

Any of the devices or systems described herein can be implemented by one or more computing devices. A computing device can include a processor, a memory, a storage device, an input/output (I/O) interface, and a communication interface, which can be communicatively coupled via a communication infrastructure. Additional or alternative components may be used in other embodiments. In some embodiments, a processor includes hardware for executing computer program instructions by retrieving the instructions from an internal register, an internal cache, or other memory or storage device, and decoding and executing them. The memory can be used for storing data or instructions for execution by the processor. The memory can be a suitable storage mechanism, such as RAM, ROM, flash memory, solid state memory, and the like. The storage device can store data or computer instructions, and can include a hard disk, flash memory, an optical disc, or any other suitable storage device. The I/O interface allows a user to interact with the computing device, and can include a mouse, keypad, keyboard, touchscreen interface, and the like. The communication interface can include hardware, software, or a combination of both, and can provide one or more interfaces for communication with other devices or entities.

Some portions of this description describe the embodiments of the disclosure in terms of algorithms and symbolic representations of operations on information. These algorithmic descriptions and representations are commonly used by those skilled in the art to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combination thereof.

Any steps, operations, or processes described herein may be performed or implemented with one or more hardware or software modules, alone or in combination with other devices. In some embodiments, a software module is implemented with a computer program product including a computer-readable medium containing computer program code, which can be executed by a computer processor for performing any or all of the steps, operations, or processes described.

Embodiments of the disclosure can also relate to an apparatus for performing the operations herein. This apparatus can be specially constructed for the required purposes, and/or it can include a general-purpose computing device selectively activated or configured by a computer program stored in the computer. Such a computer program can be stored in a non-transitory, tangible computer readable storage medium, or any type of media suitable for storing electronic instructions, which can be coupled to a computer system bus. Furthermore, any computing systems referred to in the specification can include a single processor or can be architectures employing multiple processor designs for increased computing capability.

Embodiments of the disclosure can also relate to a product that is produced by a computing processor described herein. Such a product can include information resulting from a computing processor, where the information is stored on a non-transitory, tangible computer readable storage medium and may include any embodiment of a computer program product or other data combination described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. One or more operations of one or more methods can be optional. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Finally, the language used in the specification has been principally selected for readability and instructional purposes, and it may not have been selected to delineate or circumscribe the disclosure. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

What is claimed is:

1. A robotic ventilation system for automatic delivery of gas, comprising:
   a robot comprising an arm, the arm comprising a flange, the flange coupled to an end of the arm, the arm configured to move the flange along a degree of freedom;
   a mask coupled to the flange, the mask configured to deliver gas to a user;
   a ventilator coupled to the mask, the ventilator configured to deliver the gas to the mask;
   a gas tube coupled to both the mask and the ventilator, the gas tube configured to carry gas between the ventilator and the mask;
   a controller configured to change a pose of the mask, the controller further configured to deliver gas from the ventilator to the mask; and
   a tracking system, the tracking system configured to capture image data of one or more of the mask and a face of the user, wherein the controller is configured to change the mask pose based at least in part on the image data, wherein following bringing the mask into contact with the face of the user, the system commands the arm to maintain one or more of an appropriate contact force of the mask with respect to the user's face and an appropriate pose of the mask with respect to the user's face.

2. The system of claim 1, wherein following movement of the face of the user, the system is configured to move the arm so as to do one or more of move the mask's pose and change the mask's contact force to maintain both the appropriate contact force of the mask against the user's face and the appropriate pose of the mask with respect to the user's face.

3. A robotic ventilation system for automatic delivery of gas, comprising:
   a robot comprising an arm, the arm comprising a flange, the flange coupled to an end of the arm, the arm configured to move the flange along a degree of freedom;
   a mask coupled to the flange, the mask configured to deliver gas to a user;
   a ventilator coupled to the mask, the ventilator configured to automatically deliver pressurized gas to the mask after detecting a requisite sleep state of the user, wherein the requisite sleep state is one or more of predetermined by the user and determined by the system; wherein following a start of delivery of pressurized gas to the user, the system commands the arm to maintain both an appropriate mask contact force with respect to a face of the user and an appropriate mask pose with respect to the user's face, wherein following movement of the user's face, the arm is configured to do one or more of move the mask's pose and change the mask's contact force to maintain both the appropriate mask contact force with respect to the user's face and the appropriate mask pose with respect to the user's face, wherein following a failure of the system to maintain both an appropriate mask contact force and an appropriate mask pose, the system is configured to retract the arm so as to move the mask away from the face of the user, wherein following retraction of the arm, if the system determines that the user is in the requisite sleep state, the system is configured to move the mask toward the face of the user, wherein following retraction of the mask, if the user is awake, the system is configured to go into a mode in which it awaits entry into the requisite sleep state by the user, wherein following the entry into the requisite sleep state by the user, the system moves the mask toward the face of the user;
   a gas tube coupled to both the mask and the ventilator, the gas tube configured to carry gas between the ventilator and the mask;
   a controller configured to change the pose of the mask, the controller further configured to deliver gas from the ventilator to the mask, wherein the controller is further configured to change the mask pose based on one or more of the image data, lapse of a predetermined period of time, and an estimated sleep state of the user, wherein the estimated sleep state comprises one or more of a requisite sleep state and an estimation of stability of the user's sleep state, wherein the system transitions from the sleep state to an approach state if the system determines the estimated sleep state of the user is the requisite sleep state and if the system further determines that the estimated sleep state of the user is stable, wherein the system transitions from the sleep state to a wait for sleep state in which the system waits if the system determines one or more of that the estimated sleep state of the user is not the requisite sleep state and that the estimated sleep state of the user is not stable;
   a tracking system, the tracking system configured to capture image data of one or more of the mask and the face of the user, the tracking system comprising an illumination system configured to emit light in a field of view of the tracking system, the tracking system further configured to identify a face feature point, wherein the face feature point comprises one or more of an eye center point, a nose center point, a mouth lateral point, and a mouth center point, wherein the system moves the mask toward the face of the user after the face feature point is identified; and
   a biometric sensor system, the biometric sensor system comprising a biometric sensor, wherein the controller is configured to change the mask pose based at least in part on biometric data from the biometric sensor system.

4. The robotic ventilation system of claim 3, wherein the system determines in real time that the user is in the requisite sleep state.

5. A robotic ventilation method for automatic delivery of gas, comprising:
   receiving input from one or more of a user and a system component, by a system comprising: a robotic ventilation system for automatic delivery of gas, the robotic ventilation system comprising: a robot, the robot comprising an arm, the arm comprising a flange, the flange coupled to an end of the arm, the arm configured to move the flange along a degree of freedom; a mask coupled to the flange, the mask configured to deliver gas to the user; a ventilator coupled to the mask, the ventilator configured to deliver the gas to the mask; a gas tube coupled to both the mask and the ventilator, the gas tube configured to carry gas between the ventilator and the mask; a controller configured to change a pose of the mask, the controller further configured to deliver gas from the ventilator to the mask; and a tracking system, the tracking system configured to capture image data of one or more of the mask and a face of the user, wherein the user input comprises information regarding one or more of a mask position and a mask orientation that the user wishes to associate with a given state of the system;

wherein the controller is configured to change the mask pose based at least in part on the image data;

transitioning, by the system, based on the input, from a first state to a second state;

storing, by the system, a parameter based on the received further user input;

associating with the given state, by the system, one or more of the mask position and the mask orientation; and storing, by the system, the one or more of the mask position and the mask orientation.

6. The method of claim 5, in which the system receives the input from the user.

7. The method of claim 5, wherein the user input comprises one or more of a user-desired idle pose, a user-desired ready pose, a user-desired seated pose, and a user-desired accessory pose.

8. The method of claim 5, wherein the user input comprises information regarding one or more of the mask position and the mask orientation that the user wishes to associate with the given state of the user.

9. The method of claim 5, comprising a further step, performed after the transitioning step and before the step of storing the parameter, of:

initiating user input, by the system.

10. The method of claim 5, wherein the step of storing the parameter comprises storing the one or more of the mask position and the mask orientation in a database.

11. The method of claim 10, wherein the database comprises one or more of a sensor database, a signals database, an inertial measurement unit (IMU) database, an image database, an estimated state database, a biometric database, a key points of interest database, and a pose database.

12. The method of claim 5, wherein the first state of the system comprises one or more of a booting state, an idle state, a ready state, a wait for sleep state, a calibration/service state, a learning state, an accessory state, a wait for sleep state, a sleep state, an approach state, a seated state, a face force control state, a retract state, and an error state.

13. The method of claim 5, wherein the second state of the system comprises one or more of a booting state, an idle state, a ready state, a wait for sleep state, a calibration/service state, a learning state, an accessory state, a wait for sleep state, a sleep state, an approach state, a seated state, a face force control state, a retract state, and an error state.

14. The method of claim 13, wherein in the face force control state, the system maintains the mask with both an appropriate contact force and an appropriate position with respect to the face of the user.

15. The method of claim 14, wherein in the face force control state, the system maintains the mask with both the appropriate contact force and the appropriate position even while the user moves.

16. The method of claim 14, wherein the system maintains the mask in real time with both the appropriate contact force and the appropriate position.

17. The method of claim 5, wherein the parameter comprises one or more of pressure, volume, air flow, air leakage, a power level, a user's heart rate, the user's respiratory rate, the user's temperature, the user's blood oxygen saturation, ambient light, ambient sound, the user's eye state, a user-desired idle pose, a user-desired ready pose, a user-desired seated pose, and a user-desired accessory pose.

* * * * *